(12) United States Patent
Kolb et al.

(10) Patent No.: US 9,403,300 B2
(45) Date of Patent: *Aug. 2, 2016

(54) PATTERNED GRADIENT POLYMER FILM AND METHOD

(75) Inventors: William Blake Kolb, West Lakeland, MN (US); Michael Benton Free, Saint Paul, MN (US); Brant U. Kolb, Afton, MN (US); Fei Lu, Woodbury, MN (US); John A. Wheatley, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 265 days.

This patent is subject to a terminal disclaimer.

(21) Appl. No.: 13/639,948

(22) PCT Filed: Oct. 22, 2010

(86) PCT No.: PCT/US2010/053654
§ 371 (c)(1),
(2), (4) Date: Oct. 8, 2012

(87) PCT Pub. No.: WO2011/129848
PCT Pub. Date: Oct. 20, 2011

(65) Prior Publication Data
US 2013/0039094 A1 Feb. 14, 2013

Related U.S. Application Data

(60) Provisional application No. 61/323,941, filed on Apr. 14, 2010.

(51) Int. Cl.
*B32B 3/26* (2006.01)
*B32B 5/14* (2006.01)
(Continued)

(52) U.S. Cl.
CPC .............. *B29C 41/24* (2013.01); *G02B 5/0247* (2013.01); *B05D 3/067* (2013.01); *B05D 2490/50* (2013.01); *B05D 2490/60* (2013.01); *B29C 2035/0827* (2013.01); *B29K 2995/0018* (2013.01); *G02F 2001/133631* (2013.01);
(Continued)

(58) Field of Classification Search
CPC  B29C 41/24; B29C 2035/0827; B05D 3/067; B05D 2490/50; B05D 2490/60; B29K 2995/0018; G02B 5/0247; G02F 2001/133631
USPC ........................ 428/304.4, 308.4, 310.5, 315.9
See application file for complete search history.

(56) References Cited

U.S. PATENT DOCUMENTS 6,455,103 B1 * 9/2002 Mennig et al. ................ 427/165
6,719,426 B2    4/2004 Magarill
(Continued)

FOREIGN PATENT DOCUMENTS

EP          0924537        6/1999
JP          H04-121701     4/1992
(Continued)

*Primary Examiner* — Victor Chang
(74) *Attorney, Agent, or Firm* — Yen Tong Florczak

(57) ABSTRACT

The present disclosure generally relates to patterned gradient polymer films and methods for making the same, and more particularly to patterned gradient optical films that have regions that include variations in optical properties such as refractive index, haze, transmission, clarity, or a combination thereof. The variation in optical properties can occur across a transverse plane of the film as well as through a thickness direction of the film.

14 Claims, 14 Drawing Sheets

(51) Int. Cl.
  *B29C 41/24* (2006.01)
  *G02B 5/02* (2006.01)
  *B05D 3/06* (2006.01)
  *B29C 35/08* (2006.01)
  *G02F 1/13363* (2006.01)

(52) U.S. Cl.
  CPC .. *Y10T428/249961* (2015.04); *Y10T 428/2933* (2015.01)

(56) References Cited

U.S. PATENT DOCUMENTS

| | | | |
|---|---|---|---|
| 6,846,098 | B2 | 1/2005 | Bourdelais |
| 6,898,012 | B2 | 5/2005 | Kaminsky |
| 6,900,941 | B2 | 5/2005 | Kaminsky |
| 6,924,014 | B2 | 8/2005 | Ouderkirk |
| 6,937,399 | B2 | 8/2005 | Takahashi |
| 7,526,164 | B2 | 4/2009 | Ouderkirk |
| 7,599,592 | B2 | 10/2009 | Benson, Jr. |
| 2002/0132101 | A1 | 9/2002 | Fonash |
| 2004/0202822 | A1 | 10/2004 | Bourdelais |
| 2005/0042764 | A1 | 2/2005 | Sailor |
| 2005/0106333 | A1 | 5/2005 | Lehmann |
| 2005/0112296 | A1 | 5/2005 | Laney |
| 2007/0065638 | A1 | 3/2007 | Wang |
| 2007/0287104 | A1 | 12/2007 | Doshi |
| 2008/0064133 | A1 | 3/2008 | Lee |
| 2008/0080055 | A1 | 4/2008 | Lightfoot |
| 2010/0227085 | A1 | 9/2010 | Yoshihara |

FOREIGN PATENT DOCUMENTS

| | | |
|---|---|---|
| JP | H11-281802 | 10/1999 |
| JP | 2003-043215 | 2/2003 |
| JP | 2004-182490 | 7/2004 |
| JP | 2006-086416 | 3/2006 |
| JP | 2007-145941 | 6/2007 |
| JP | 2007-264343 | 10/2007 |
| JP | 2009086436 | 4/2009 |
| JP | 2010003646 | 1/2010 |
| WO | WO 01/67140 | 9/2001 |
| WO | WO 2008-144636 | 11/2008 |
| WO | WO 2008-144644 | 11/2008 |
| WO | WO 2009/123596 | 10/2009 |
| WO | WO 2010-059566 | 5/2010 |
| WO | WO 2010-059568 | 5/2010 |
| WO | WO 2010-059579 | 5/2010 |
| WO | WO 2010-059614 | 5/2010 |
| WO | WO 2010-120422 | 10/2010 |
| WO | WO 2010-120468 | 10/2010 |
| WO | WO 2010-120845 | 10/2010 |
| WO | WO 2010-120864 | 10/2010 |
| WO | WO 2010-120871 | 10/2010 |
| WO | WO 2010-120971 | 10/2010 |
| WO | WO 2010-121019 | 10/2010 |
| WO | WO 2011-050226 | 4/2011 |
| WO | WO 2011-050228 | 4/2011 |
| WO | WO 2011-050232 | 4/2011 |
| WO | WO 2011-050254 | 4/2011 |
| WO | WO 2011-050268 | 4/2011 |
| WO | WO 2012-054318 | 4/2012 |

* cited by examiner

PATTERNED GRADIENT POLYMER FILM AND METHOD

RELATED APPLICATIONS

This application is related to the following U.S. patent applications, filed on Apr. 15, 2009, and which are incorporated by reference: "Optical Construction and Display System Incorporating Same" (U.S. Ser. No. 61/169,521); "Retroreflecting Optical Construction" (U.S. Ser. No. 61/169,532); "Optical Film for Preventing Optical Coupling" (U.S. Ser. No. 61/169,549); "Backlight and Display System Incorporating Same" (U.S. Ser. No. 61/169,555); "Process and Apparatus for Coating with Reduced Defects" (U.S. Ser. No. 61/169,427); and "Process and Apparatus for a Nanovoided Article" (U.S. Ser. No. 61/169,429).

This application is also related to the following U.S. patent applications filed on Oct. 23, 2009, and which are incorporated by reference: "Process for Gradient Nanovoided Article" (U.S. Ser. No. 61/254,674); "Immersed Reflective Polarizer with High Off-Axis Reflectivity" (U.S. Ser. No. 61/254,691); "Immersed Reflective Polarizer with Angular Confinement in Selected Planes of Incidence" (U.S. Ser. No. 61/254,692); "Light Source and Display System Incorporating Same" (U.S. Ser. No. 61/254,672); and "Gradient Low Index Article and Method" (U.S. Ser. No. 61/254,673).

BACKGROUND

Optical systems, such as retroreflecting or display systems, utilize one or more optical layers for managing incident light. Often, the optical layers are required to have a desired optical transmittance, optical haze, optical clarity, or index of refraction. In many applications, an air layer and a diffuser layer are incorporated into the optical system. Typically, the air layer supports total internal reflection and the diffuser layer provides optical diffusion.

Articles having a structure of nanometer sized pores or voids can be useful for applications based on optical, physical, or mechanical properties provided by their nanovoided composition. For example, a nanovoided article includes a polymeric solid network or matrix that at least partially surrounds pores or voids. The pores or voids are often filled with a gas such as air. The dimensions of the pores or voids in a nanovoided article can generally be described as having an average effective diameter which can range from about 1 nanometer to about 1000 nanometers. The International Union of Pure and Applied Chemistry (IUPAC) have provided three size categories of nanoporous materials: micropores with voids less than 2 nm, mesopores with voids between 2 nm and 50 nm, and macropores with voids greater than 50 nm. Each of the different size categories can provide unique properties to a nanovoided article.

SUMMARY

The present disclosure generally relates to patterned gradient polymer films and methods for making the same, and more particularly to patterned gradient optical films that have regions that include variations in refractive index, haze, transmission, clarity, or a combination thereof. In one aspect, the present disclosure provides a gradient polymer film that includes a binder and a plurality of nanovoids, wherein a local volume fraction of the plurality of nanovoids varies across a transverse plane of the gradient polymer film.

In another aspect, the present disclosure provides a gradient polymer film that includes a binder and a plurality of nanovoids, wherein a first local volume fraction of the plurality of nanovoids proximate a first region of the gradient polymer film is greater than a second local volume fraction of the plurality of nanovoids proximate a second region adjacent the first region, along a transverse plane of the gradient polymer film.

In yet another aspect, the present disclosure provides an optical construction that includes a substrate and a gradient polymer film disposed on the substrate. Further, the gradient polymer film includes a binder and a plurality of nanovoids, wherein a local volume fraction of the plurality of nanovoids varies across a transverse plane of the gradient polymer film. Still further, the substrate includes at least one of a release liner, an adhesive, a volume diffuser, a surface diffuser, a diffractive diffuser, a refractive diffuser, a retroreflector, an absorbing polarizer, a reflective polarizer, a fiber polarizer, a cholesteric polarizer, a multilayer polarizer, a wire grid polarizer, a partial reflector, a volume reflector, a multilayer polymer reflector, a metal reflector, a metal/dielectric multilayer reflector, a fiber, a lens, a microstructure, a solid light guide, or a hollow light guide.

In yet another aspect, the present disclosure provides an optical construction that includes a substrate and a gradient polymer film disposed on the substrate. Further, the gradient polymer film includes a binder and a plurality of nanovoids, wherein a first local volume fraction of the plurality of nanovoids proximate a first region of the gradient polymer film is greater than a second local volume fraction of the plurality of nanovoids proximate a second region adjacent the first region, along a transverse plane of the gradient polymer film. Still further, the substrate includes at least one of a release liner, an adhesive, a volume diffuser, a surface diffuser, a diffractive diffuser, a refractive diffuser, a retroreflector, an absorbing polarizer, a reflective polarizer, a fiber polarizer, a cholesteric polarizer, a multilayer polarizer, a wire grid polarizer, a partial reflector, a volume reflector, a multilayer polymer reflector, a metal reflector, a metal/dielectric multilayer reflector, a fiber, a lens, a microstructure, a solid light guide, or a hollow light guide.

In yet another aspect, the present disclosure provides a process for a gradient polymer film that includes disposing a solution on a substrate to form a coating, the coating including a polymerizable binder and a solvent; selectively polymerizing a first portion of the coating to form an insoluble polymer matrix in the solvent; removing a major portion of the solvent from the coating; and polymerizing a second portion of the coating adjacent the first portion.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
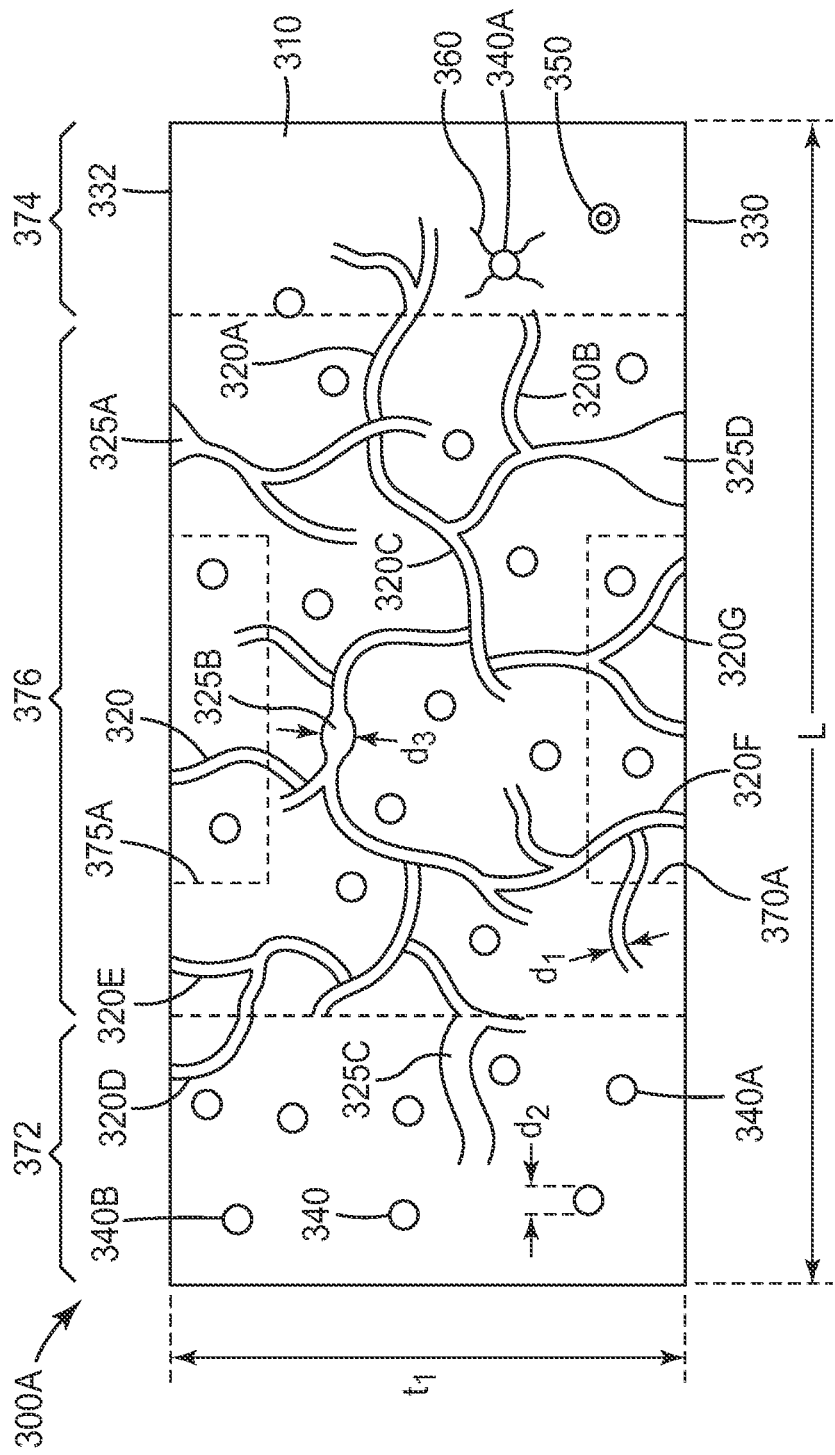
FIG. 1A is a schematic side-view of a gradient optical film.

This disclosure generally relates to polymer films, in particular optical films that exhibit some low-index-like optical properties, or otherwise interact with the transmission, scattering, absorption, refraction or reflection of light; however, it is to be understood that the polymer films can instead interact non-optically with the environment, as a result of the structure generated in the film, as described elsewhere. In one particular embodiment, the optical films can exhibit low-index-like optical properties that vary along a transverse plane of the optical films, that is, gradient optical films. The transverse plane of a film can be described as a plane that is parallel to at least one of the surfaces of the film. Some disclosed gradient optical films exhibit a local porosity that varies along a transverse plane of the gradient optical films. In some cases, the optical films can exhibit optical properties or local porosity that can also vary through a thickness direction of the optical film. Generally, the local porosity may be described by a local void volume fraction, or as a local pore size distribution, or by both local void volume fraction, and local pore size distribution.

The disclosure also describes articles and methods to produce films with gradient optical properties/porosity within the film. These films are characterized by having continuous crossweb, downweb, or combined gradients of optical properties such as transmission, haze, clarity, refractive index, etc. The gradient pattern can be created by, for example, optically patterning a porous layer made by the described process, with temporal or spatial control of the curing conditions such as power to UV LEDs, shadow masks, controlled UV absorption, controlled drying, or the like, or combinations thereof. The disclosed gradient films can be used in applications including, for example, light guide variable extractors including solid light guide extractors, hollow (air) guide extractors, fibers and the like; gradient diffuser films (that is, varying haze, clarity, or transmission) useful, for example, for defect and/or bulb hiding, particularly in backlit displays; variable diffusers; variable absorbers; variable reflectors including enhanced specular reflectors (ESR) for daylighting; and the like.

Some portions of the disclosed gradient optical films can have a low optical haze and a low effective index of refraction, such as an optical haze of less than about 5% and an effective index of refraction that is less than about 1.35, that can vary across a transverse plane of the optical film. Some portions of the disclosed gradient optical films can have a high optical haze, such as an optical haze of greater than about 50%, and/or high diffuse optical reflectance while manifesting some low-index-like optical properties, such as, for example, the ability to support total internal reflection or enhance internal reflection, that can also vary across a transverse plane of the optical film. In some cases, the disclosed gradient optical films can be incorporated in various optical or display systems such as, for example, a general lighting system, a liquid crystal display system, or a retro-reflecting optical system to improve system durability, reduce manufacturing cost, and reduce the overall thickness of the system while improving, maintaining or substantially maintaining at least some of the system optical properties such as, for example, the retro-reflectivity of the system or the on-axis brightness and contrast of an image displayed by the system.

In one particular embodiment, the gradient optical films disclosed herein include variations in the properties of the optical film along a transverse plane (that is, the "x" and/or "y" directions that are mutually perpendicular to the "z", or thickness, direction) of the film. Co-pending U.S. patent applications entitled "Gradient Low Index Article and Method" (U.S. Ser. No. 61/254,673) and "Process for Gradient Nanovoided Article" (U.S. Ser. No. 61/254,674) are generally directed toward variations in the properties in a thickness direction (that is, the "z" direction) of the optical film. It is to be understood that the techniques used for making the "z" direction gradients can be used concurrently with the techniques for "x" and/or "y" direction gradients, and as such, gradient optical films can be fabricated that include a variation in one, two, or all three of the mutually orthogonal directions.

The gradient optical films typically include a plurality of nanovoids, interconnected voids, or generally a network of voids dispersed in a binder. At least some of the voids in the plurality or network are connected to one another via hollow tunnels or hollow tunnel-like passages. The voids are not necessarily free of all matter and/or particulates. For example, in some cases, a void may include one or more small fiber- or string-like objects that include, for example, a binder and/or nano-particles. In some cases, a void may include particles or particle agglomerates that may be attached to the binder, or may be loose within the void. Some disclosed gradient optical films include multiple pluralities of interconnected voids or multiple networks of voids where the voids in each plurality or network are interconnected. In some cases, in addition to multiple pluralities of interconnected voids, the disclosed gradient optical films include a plurality of closed or unconnected voids meaning that the voids are not connected to other voids via tunnels.

In some cases, the gradient optical films can improve the durability of portions of similar optical films that do not have a gradient structure. In some cases, portions of one surface of the gradient optical film may resist abrasion due to, for example, a densified surface or a toughened surface in one region of the film surface. In some cases, the gradient optical films may exhibit improved environmental stability, since a sealed or a densified surface may prevent contaminants from entering the interior of the gradient optical film. In some cases, a sealed or densified surface may enhance cleanliness of the gradient optical films, since particles entrained within interior pores may become trapped such that mechanical forces may be unable to remove them.

In one particular embodiment, the gradient optical films can include a plurality of interconnected voids or a network of voids, such as nanovoids, having a local volume fraction or a local pore-size distribution that varies along a transverse plane of the gradient optical film. As used herein, "local volume fraction" means the volume fraction of a component (for example, the plurality of interconnected voids, or nanovoids) measured on a local scale, and "local pore-size distribution" means the pore-size distribution of a component (for example, the size distribution of the nanovoids or interconnected voids) measured on a local scale. In one particular embodiment, that is, the thickness gradients described elsewhere, the local scale can be, for example, in a region less than about 10%, or less than about 5%, or less than about 3%, or less than about 1% of the total thickness of the gradient optical film. In one particular embodiment, that is, the gradients along the transverse plane described herein, the local scale can be, for example, in a region less than about 10%, or less than about 5%, or less than about 3%, or less than about 1% of the smaller of the width or the length of the gradient optical film.

As used herein, the local volume fraction of nanovoids and the local pore-size distribution of nanovoids are collectively referred to as a "local morphology" of the gradient film. Generally, it is a change in the local morphology of the gradient film that produces the desired optical, physical (for example, thermal, electrical, acoustic, transport, surface energy), or mechanical property. In some cases, the local volume fraction of nanovoids can remain constant along the transverse plane, and the local pore-size distribution of nanovoids can vary along the transverse plane. In some cases, the local volume fraction of nanovoids can vary along the transverse plane, and the local pore-size distribution of nanovoids can remain constant along the transverse plane. In some cases, the local volume fraction of nanovoids can vary along the transverse plane, and the local pore-size distribution of nanovoids can also vary along the transverse plane. In a similar manner, each of the local volume fraction of nanovoids and the local pore-size distribution of nanovoids can either vary or remain constant throughout the thickness (or "z" direction), as described elsewhere.

In one particular embodiment, the local volume fraction can vary across the transverse plane of the gradient optical film, such that the local volume fraction proximate a first region of the film can be greater or less than the local volume fraction proximate a second region of the film adjacent the first region along the transverse plane of the gradient optical film. The bulk volume fraction of interconnected voids is the ratio of the volume of voids in the optical film to the total volume of the optical film; in a similar manner, the bulk pore-size distribution is an average of the pore-size distribution taken over the total volume of the optical film.

In some cases, the local volume fraction can have very few nanovoids, and the film can be said to be essentially void free in that region of the film. In some cases, the local volume fraction can vary in a continuous manner along a transverse plane of the film, such as either a monotonic increase or decrease in the local volume fraction along the transverse plane of the gradient optical film. In some cases, the local volume fraction can go through a local maximum or a local minimum across a transverse plane of the gradient optical film. In some cases, the local volume fraction can vary in a discontinuous manner along transverse plane of the gradient optical film, for example, a step-change in the local volume fraction of interconnected voids or the local pore-size distribution, or both.

Control of the local morphology can be useful in several applications including, for example, when a material is coated on a surface of the gradient optical film. In some cases, the coated material may include a solvent or other high mobility component such as, for example, a low molecular weight curable material, which can penetrate the interconnected voids of the gradient optical film. In some cases, the coated material may include a thermoplastic solid or a gelled material, such as a transfer adhesive or a pressure sensitive adhesive (PSA) that, upon thermal cycling or aging, can penetrate into the porous structure of interconnected voids. Penetration of a material into the interconnected voids of the gradient optical film can alter properties of the film, including, for example, increasing the refractive index in the penetration region.

In one particular embodiment, a change in the local morphology can provide control over this penetration proximate one region of the gradient optical film, while maintaining a desired local volume fraction of the interconnected voids proximate an adjacent region of the gradient optical film. In some cases, the local volume fraction proximate one region of the gradient optical film can be lower than the bulk volume fraction and also lower than the local volume fraction proximate an adjacent region of the gradient optical film. In some cases, the local volume fraction can be decreased so that only limited infusion can take place. Limited infusion of material to form a gradient optical film can be useful, for example, to strengthen a surface of a fragile optical film that has a high bulk volume fraction of interconnected voids. In some cases, a lower volume fraction of interconnected voids in a gradient optical film can improve the structural integrity, that is, the durability of the optical film.

In some cases, the local volume fraction can be decreased to near zero local volume fraction of interconnected voids, effectively sealing a first region of the surface. Control of the local morphology can include techniques such as, for example, inhibiting or promoting the rate and extent of cure on one or more regions of the gradient optical film, infusion of a material to at least partially fill a portion of the voids, and the like. In general, control over the local morphology can be accomplished by techniques described elsewhere, including, for example, in co-pending application U.S. Ser. No. 61/254,674, entitled "PROCESS FOR GRADIENT NANOVOIDED ARTICLE", filed on Oct. 23, 2009.

Some disclosed gradient optical films support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR). In the case of high haze voided films, the oblique angle reflectivity can be close to 100% over a similar range of incident angles even though the light may not undergo TIR. This enhanced reflectivity for high haze films is similar to TIR and is designated as Enhanced Internal Reflectivity (EIR). As used herein, by a porous or voided gradient optical film enhancing internal reflection (EIR), it is meant that the reflectance at the boundary of the voided and non-voided strata of the film or film laminate is greater with the voids than without the voids.

The voids in the disclosed gradient optical films have an index of refraction $n_v$ and a permittivity $\in_v$, where $n_v^2 = \in_v$, and the binder has an index of refraction $n_b$ and a permittivity $\in_b$, where $n_b^2 = \in_b$. In general, the interaction of a gradient optical film with light, such as light that is incident on, or propagates in, the gradient optical film, depends on a number of film characteristics such as, for example, the film thickness, the binder index, the void or pore index, the pore shape and size, the spatial distribution of the pores, and the wavelength of light. In some cases, light that is incident on or propagates within the gradient optical film, "sees" or "experiences" an effective permittivity $\in_{eff}$ and an effective index $n_{eff}$, where $n_{eff}$ can be expressed in terms of the void index $n_v$, the binder index $n_b$, and the void porosity or volume fraction "f". In such cases, the gradient optical film is sufficiently thick and the voids are sufficiently small so that light cannot resolve the shape and features of a single or isolated void. In such cases, the size of at least a majority of the voids, such as at least 60% or 70% or 80% or 90% of the voids, is not greater than about λ/5, or not greater than about λ/6, or not greater than about λ/8, or not greater than about λ/10, or not greater than about λ/20, where λ is the wavelength of light.

In some cases, light that is incident on a disclosed gradient optical film is a visible light meaning that the wavelength of the light is in the visible range of the electromagnetic spectrum. In such cases, the visible light has a wavelength that is in a range from about 380 nm to about 750 nm, or from about 400 nm to about 700 nm, or from about 420 nm to about 680 nm. In such cases, the gradient optical film has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed gradient optical films are sufficiently thick so that the gradient optical film can reasonably have an effective index that can be expressed in terms of the indices of refraction of the voids and the binder, and the void or pore volume fraction or porosity. In such cases, the thickness of the gradient optical film is not less than about 100 nm, or not less than about 200 nm, or not less than about 500 nm, or not less than about 700 nm, or not less than about 1,000 nm.

When the voids in a disclosed gradient optical film are sufficiently small and the gradient optical film is sufficiently thick, the gradient optical film has an effective permittivity $\in_{\mathit{eff}}$ that can be expressed as:

$$\in_{\mathit{eff}} = f\in_v + (1-f)\in_b \quad (1)$$

In such cases, the effective index $n_{\mathit{eff}}$ of the gradient optical film can be expressed as:

$$n_{\mathit{eff}}^2 = f n_v^2 + (1-f) n_b^2 \quad (2)$$

In some cases, such as when the difference between the indices of refraction of the pores and the binder is sufficiently small, the effective index of the gradient optical film can be approximated by the following expression:

$$n_{\mathit{eff}} = f n_v + (1-f) n_b \quad (3)$$

In such cases, the effective index of the gradient optical film is the volume weighted average of the indices of refraction of the voids and the binder. For example, a gradient optical film that has a void volume fraction of about 50% and a binder that has an index of refraction of about 1.5, has an effective index of about 1.25.

FIG. 1A is a schematic side-view of a gradient optical film 300A that includes a network of voids or plurality of interconnected voids 320 and a plurality of particles 340 dispersed within a binder 310. Gradient optical film 300A has a porous interior by virtue of the presence of network of voids 320 within the gradient optical film. In general, the gradient optical film can include one or more networks of interconnected pores or voids. For example, network of voids 320 can be regarded to include interconnected voids or pores 320A-320C.

In some cases, a local morphology, for example a first local volume fraction of interconnected voids 370A and a second volume fraction of interconnected voids 375A, can vary along a thickness $t_1$ direction (also referred to as the "z" direction) within gradient optical film 300A. In FIG. 1A, for example, first local volume fraction of interconnected voids 370A has been depicted as being greater than second volume fraction of interconnected voids 375A. The local volume fraction of interconnected voids, and pore-size distribution, can vary along the thickness direction in several ways, for example, as described in "Process for Gradient Nanovoided Article" (U.S. Ser. No. 61/254,674); and "Gradient Low Index Article and Method" (U.S. Ser. No. 61/254,673).

In some cases, a local volume fraction of interconnected voids, for example a third local volume fraction of interconnected voids 372, a fourth local volume fraction of interconnected voids 374, and a fifth local volume fraction of interconnected voids 376, can vary along the direction of a transverse plane "L" (that is, generally along the "x" and/or "y" direction) within gradient optical film 300A. In FIG. 1A, for example, fifth local volume fraction of interconnected voids 376 has been depicted as being greater than either the third local volume fraction of interconnected voids 372 or the fourth local volume fraction of interconnected voids 374. The local volume fraction of interconnected voids, and void size distribution, can also vary along the thickness direction in several ways, as described elsewhere. In some cases, the gradient optical film is a porous film meaning that the network of voids 320 forms one or more passages between first and second major surfaces 330 and 332, respectively. In some cases, the local volume fraction of interconnected voids can vary along any combination of the "x", "y", and "z" directions.

The network of voids can be regarded to include a plurality of interconnected voids. Some of the voids can be at a surface of the gradient optical film and can be regarded to be surface voids. For example, in the exemplary gradient optical film 300A, voids 320D and 320E are at a second major surface 332 of the gradient optical film and can be regarded as surface voids 320D and 320E, and voids 320F and 320G are at a first major surface 330 of the gradient optical film and can be regarded as surface voids 320F and 320G. Some of the voids, such as for example voids 320B and 320C, are within the interior of the gradient optical film and away from the exterior surfaces of the gradient optical film and can be regarded as interior voids 320B and 320C, even though an interior void can be connected to a major surface via, for example, other voids.

Voids 320 have a size $d_1$ that can generally be controlled by choosing suitable composition and fabrication techniques, such as the various coating, drying and curing conditions. In general, $d_1$ can be any desired value in any desired range of values. For example, in some cases, at least a majority of the voids, such as at least 60% or 70% or 80% or 90% or 95% of the voids, have a size that is in a desired range. For example, in some cases, at least a majority of the voids, such as at least 60% or 70% or 80% or 90% or 95% of the voids, have a size that is not greater than about 10 microns, or not greater than about 7 microns, or not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, plurality of interconnected voids 320 has an average void or pore size that is not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, some of the voids can be sufficiently small so that their primary optical effect is to reduce the effective index, while some other voids can reduce the effective index and scatter light, while still some other voids can be sufficiently large so that their primary optical effect is to scatter light.

Particles 340 have a size $d_2$ that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm, or even not greater than about 20 nm.

In some cases, plurality of particles 340 has an average particle size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, some of the particles can be sufficiently small so that they primarily affect the effective index, while some other particles can affect the effective index and scatter light, while still some other particles can be sufficiently large so that their primary optical effect is to scatter light.

In some cases, $d_1$ and/or $d_2$ are sufficiently small so that the primary optical effect of the voids and the particles is to affect the effective index of gradient optical film 300A. For example, in such cases, $d_1$ and/or $d_2$ are not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. As another example, in such cases, $d_1$ and $d_2$ are not greater than about 70 nm, or not greater than about 60 nm, or not greater than about 50 nm, or not greater than about 40 nm, or not greater than about 30 nm, or not greater than about 20 nm, or not greater than about 10 nm. In such cases, the voids and the particles may also scatter light, but the primary optical effect of the voids and the particles is to define an effective medium in the gradient optical film that has an effective index. The effective index depends, in part, on the indices of refraction of the voids, the binder, and the particles. In some cases, the effective index is a reduced effective index, meaning that the effective index is less than the index of the binder and the index of the particles.

In cases where the primary optical effect of the voids and/or the particles is to affect the index, $d_1$ and $d_2$ are sufficiently small so that a substantial fraction, such as at least about 60%, or at least about 70%, or at least about 80%, or at least about 90%, or at least about 95% of voids 320 and particles 340 have the primary optical effect of reducing the effective index. In such cases, a substantial fraction, such as at least about 60%, or at least about 70%, or at least about 80%, or at least about 90%, or at least about 95% the voids and/or the particles, have a size that is in a range from about 1 nm to about 200 nm, or from about 1 nm to about 150 nm, or from about 1 nm to about 100 nm, or from about 1 nm to about 50 nm, or from about 1 nm to about 20 nm.

In some cases, the index of refraction $n_1$ of particles 340 can be sufficiently close to the index $n_b$ of binder 310, so that the effective index does not depend, or depends very little, on the index of refraction of the particles. In such cases, the difference between $n_1$ and $n_b$ is not greater than about 0.01, or not greater than about 0.007, or not greater than about 0.005, or not greater than about 0.003, or not greater than about 0.002, or not greater than about 0.001. In some cases, particles 340 are sufficiently small and their index is sufficiently close to the index of the binder, that the particles do not primarily scatter light or affect the index. In such cases, the primary effect of the particles can, for example, be to enhance the strength of gradient optical film 300A. In some cases, particles 340 can enhance the process of making the gradient optical film, although gradient optical film 300A can be made with no particles.

In cases where the primary optical effect of network of voids 320 and particles 340 is to affect the effective index and not to, for example, scatter light, the optical haze of gradient optical film 300A that is due to voids 320 and particles 340 is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the effective medium of the gradient optical film is not greater than about 1.35, or not greater than about 1.3, or not greater than about 1.25, or not greater than about 1.2, or not greater than about 1.15, or not greater than about 1.1, or not greater than about 1.05.

In cases where gradient optical film 300A can reasonably have a reduced effective index, the thickness of the gradient optical film is not less than about 100 nm, or not less than about 200 nm, or not less than about 500 nm, or not less than about 700 nm, or not less than about 1,000 nm, or not less than about 1500 nm, or not less than about 2000 nm.

In some cases, $d_1$ and/or $d_2$ are sufficiently large so that their primary optical effect is to scatter light and produce optical haze. In such cases, $d_1$ and/or $d_2$ are not less than about 200 nm, or not less than about 300 nm, or not less than about 400 nm, or not less than about 500 nm, or not less than about 600 nm, or not less than about 700 nm, or not less than about 800 nm, or not less than about 900 nm, or not less than about 1000 nm. In such cases, the voids and the particles may also affect the index, but often, their primarily optical effect is to scatter light. In such cases, light incident on the gradient optical film can be scattered by both the voids and the particles.

Gradient optical film 300A can be used in many optical applications. For example, in some cases, the gradient optical film can be used to support or promote total internal reflection (TIR) or enhance internal reflection meaning that the reflection is greater than what a material with index $n_b$ would produce. In such cases, gradient optical film 300A is sufficiently thick so that the evanescent tail of a light ray that undergoes total internal reflection at a surface of the gradient optical film, does not optically couple, or optically couples very little, or even is controllably coupled, across the thickness of the gradient optical film. In such cases, the thickness $t_1$ of gradient optical film 300A is not less than about 1 micron, or not less than about 1.1 micron, or not less than about 1.2 microns, or not less than about 1.3 microns, or not less than about 1.4 microns, or not less than about 1.5 microns, or not less than about 1.7 microns, or not less than about 2 microns. A sufficiently thick gradient optical film 300A can prevent or reduce an undesired optical coupling of the evanescent tail of an optical mode across the thickness of the gradient optical film. The TIR properties of the gradient optical film can vary in different regions of the film, along the transverse plane, as described elsewhere.

In some cases, portions of the gradient optical film 300A have a low optical haze. In such cases, the optical haze of the gradient optical film is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the gradient optical film can have a reduced effective index that is not greater than about 1.35, or not greater than about 1.3, or not greater than about 1.2, or not greater than about 1.15, or not greater than about 1.1, or not greater than about 1.05. For light normally incident on gradient optical film 300A, optical haze, as used herein, is defined as the ratio of the transmitted light that deviates from the normal direction by more than 4 degrees to the total transmitted light. Haze values disclosed herein were measured using a Haze-Gard Plus haze meter (BYK-Gardner, Silver Springs, Md.) according to the procedure described in ASTM D1003. The haze properties of the gradient optical film can vary in different regions of the film, along the transverse plane, as described elsewhere.

In some cases, portions of the gradient optical film 300A have a high optical haze. In such cases, the haze of the gradient optical film is not less than about 40%, or not less than about 50%, or not less than about 60%, or not less than about 70%, or not less than about 80%, or not less than about 90%, or not less than about 95%. In some cases, gradient optical film 300A can have an intermediate optical haze, for example, between about 5% and about 50% optical haze.

In some cases, portions of the gradient optical film 300A have a high diffuse optical reflectance. In such cases, the diffuse optical reflectance of the gradient optical film is not less than about 30%, or not less than about 40%, or not less than about 50%, or not less than about 60%. The diffuse optical reflectance of the gradient optical film can vary in different regions of the film, along the transverse plane, as described elsewhere.

In some cases, portions of the gradient optical film 300A have a high optical clarity. For light normally incident on gradient optical film 300A, optical clarity, as used herein, refers to the ratio $(T_2-T_1)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-Gard Plus haze meter from BYK-Gardner. In the cases where gradient optical film 300A has a high optical clarity, the clarity is not less than about 40%, or not less than about 50%, or not less than about 60%, or not less than about 70%, or not less than about 80%, or not less than about 90%, or not less than about 95%. The optical clarity of the gradient optical film can vary in different regions of the film, along the transverse plane, as described elsewhere.

In some cases, portions of the gradient optical film 300A have a low optical clarity. In such cases, the optical clarity of the gradient optical film is not greater than about 40%, or not greater than about 20%, or not greater than about 10%, or not greater than about 7%, or not greater than about 5%, or not greater than about 4%, or not greater than about 3%, or not greater than about 2%, or not greater than about 1%.

In general, gradient optical film can have any porosity, pore-size distribution, or void volume fraction that may be desirable in an application. In some cases, the volume fraction of plurality of voids 320 in gradient optical film 300A is not less than about 20%, or not less than about 30%, or not less than about 40%, or not less than about 50%, or not less than about 60%, or not less than about 70%, or not less than about 80%, or not less than about 90%.

In some cases, portions of the gradient optical film can manifest some low-index properties, even if the gradient optical film has a high optical haze and/or diffuse reflectance. For example, in such cases, the portions of the gradient optical film can support TIR at angles that correspond to an index that is smaller than the index $n_b$ of binder 310.

In the exemplary gradient optical film 300A, particles 340, such as particles 340A and 340B, are solid particles. In some cases, gradient optical film 300A may additionally or alternatively include a plurality of hollow or porous particles 350.

Particles 340 can be any type particles that may be desirable in an application. For example, particles 340 can be organic or inorganic particles. For example, particles 340 can be silica, zirconium oxide or alumina particles.

Particles 340 can have any shape that may be desirable or available in an application. For example, particles 340 can have a regular or irregular shape. For example, particles 340 can be approximately spherical. As another example, the particles can be elongated. In such cases, gradient optical film 300A includes a plurality of elongated particles 340. In some cases, the elongated particles have an average aspect ratio that is not less than about 1.5, or not less than about 2, or not less than about 2.5, or not less than about 3, or not less than about 3.5, or not less than about 4, or not less than about 4.5, or not less than about 5. In some cases, the particles can be in the form or shape of a string-of-pearls (such as Snowtex-PS particles available from Nissan Chemical, Houston, Tex.) or aggregated chains of spherical or amorphous particles, such as fumed silica.

Particles 340 may or may not be functionalized. In some cases, particles 340 are not functionalized. In some cases, particles 340 are functionalized so that they can be dispersed in a desired solvent or binder 310 with no, or very little, clumping. In some cases, particles 340 can be further functionalized to chemically bond to binder 310. For example, particles 340, such as particle 340A, can be surface modified and have reactive functionalities or groups 360 to chemically bond to binder 310. In such cases, at least a significant fraction of particles 340 is chemically bound to the binder. In some cases, particles 340 do not have reactive functionalities to chemically bond to binder 310. In such cases, particles 340 can be physically bound to binder 310, or binder 310 can encapsulate particles 340.

In some cases, some of the particles have reactive groups and others do not have reactive groups. For example in some cases, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups. In some cases, some of the particles may be functionalized with both reactive and unreactive groups on the same particle.

The ensemble of particles may include a mixture of sizes, reactive and non-reactive particles and different types of particles, for example, organic particles including polymeric particles such as acrylics, polycarbonates, polystyrenes, silicones and the like; or inorganic particles such as glasses or ceramics including, for example, silica and zirconium oxide, and the like.

Binder 310 can be or include any material that may be desirable in an application. For example, binder 310 can be a curable material that forms a polymer, such as a cross-linked polymer. In general, binder 310 can be any polymerizable material, such as a polymerizable material that is radiation-curable, such as a UV curable material.

Gradient optical film 300A can be produced using any method that may be desirable in an application. In some cases, gradient optical film 300A can be produced by the processes described in co-pending application titled "PROCESS AND APPARATUS FOR A NANOVOIDED ARTICLE", U.S. Ser. No. 61/169,429, co-pending application titled "PROCESS AND APPARATUS FOR COATING WITH REDUCED DEFECTS", U.S. Ser. No. 61/169,427, and co-pending application titled "PROCESS FOR GRADIENT NANOVOIDED ARTICLE", U.S. Ser. No. 61/254,674, the disclosures of which are incorporated in their entirety herein by reference.

Generally, in one process typically referred to herein as the "GEL" process, first a solution is prepared that includes a plurality of particles, such as nano-particles, and a polymerizable material dissolved in a solvent, where the polymerizable material can include, for example, one or more types of monomers. Next, the polymerizable material is polymerized, for example by applying heat or light, to form an insoluble polymer matrix in the solvent. As the polymerization occurs, the solvent solubility (in the cured matrix) decreases and can phase separate from the matrix. This results in a matrix-rich network and phase separated solvent-rich network. The solvent is subsequently removed leaving pores and voids which yield the porous coating. The extent and type of phase separation is a primary factor in determining the morphology and topography of the film. The final structure is also dependent on the mechanical properties of the matrix network. The network modulus and strength should be sufficient to maintain a void space as the solvent is removed. The composition and extent of cure are factors in determining the morphology.

By controlling the polymerization, drying, and cure environment, the morphology can be controlled. The process may also utilize a controlled environment region between the coating station and polymerization apparatus, as described elsewhere. This region enables improved control of the coated film composition and environment. The polymerization apparatus can be located anywhere between the coating station and dryer. Controlling the environment during polymerization is also advantageous. The polymerized coating is subsequently dried and may be further post-processed with, for example, conventional UV radiation systems to further cure the material. Radiation sources that could be used in the polymerization apparatus include LEDs, UV lasers, UV lamps, and e-beam).

In some cases, after the polymerization step, the solvent may still include some of the polymerizable material, although at a lower concentration. Next, the solvent is removed by drying or evaporating the solution resulting in gradient optical film 300A that includes a network, or a plurality, of voids 320 dispersed in polymer binder 310. The gradient optical film further includes plurality of particles 340 dispersed in the polymer. The particles are bound to the binder, where the bonding can be physical or chemical, or be encapsulated by the binder.

Gradient optical film 300A can have other materials in addition to binder 310 and particles 340. For example, gradient optical film 300A can include one or more additives, such as for example, coupling agents, to help wet the surface of a substrate, not expressly shown in FIG. 1, on which the gradient optical film is formed. As another example, gradient optical film 300A can include one or more colorants, such a carbon black, for imparting a color, such as the black color, to the gradient optical film. Other exemplary materials in gradient optical film 300A include initiators, such as one or more photo-initiators; anti-stats; adhesion promoters; surfactants; UV absorbers; release agents; or others, as described elsewhere. In some cases, gradient optical film 300A can include a down converting material that is capable of absorbing light and reemitting a longer wavelength light. Exemplary down converting materials include phosphors.

In general, gradient optical film 300A can have a range of desirable porosities for any weight ratio of binder 310 to plurality of particles 340. Accordingly, in general, the weight ratio can be any value that may be desirable in an application. In some cases, the weight ratio of binder 310 to plurality of particles 340 is not less than about 1:2.5, or not less than about 1:2.3, or not less than about 1:2, or not less than about 1:1, or not less than about 1.5:1, or not less than about 2:1, or not less than about 2.5:1, or not less than about 3:1, or not less than about 3.5:1, or not less than about 4:1, or not less than about 5:1. In some cases, the weight ratio is in a range from about 1:2.3 to about 4:1.

In some cases, top major surface 332 of gradient optical film 300A can be treated to, for example, improve the adhesion of the gradient optical film to another layer. For example, the top surface can be corona treated.

FIGS. 1B-1I are schematic top views of a gradient optical film 300B-300I, respectively, according to different aspects of the disclosure. For clarity, the numbered elements 310-360 and the sizes $d_1$-$d_3$ described for FIG. 1A are not shown in FIGS. 1B-1I; however, each of the descriptions provided for gradient optical film 300A of FIG. 1A also correspond to the gradient optical film 300B-300I of FIGS. 1B-1I, respectively. It is to be understood that any of the techniques for creating a gradient optical film that varies with thickness can also be used in conjunction with the gradient optical films that vary across the transverse plane (parallel to the surface of a film) as shown in FIGS. 1A-1I. Techniques for variation in thickness gradients are described, for example, in co-pending application titled "PROCESS FOR GRADIENT NANOVOIDED ARTICLE", U.S. Ser. No. 61/254,674.

In one particular embodiment, gradient optical films having transverse plane variations can be generated, for example, by using a difference in the polymerization initiator concentration or a difference in the polymerization inhibitor concentration proximate adjacent regions. In one particular embodiment, a shadow mask can be positioned between the lamps and the coating, such that the intensity of polymerization light decreases proximate adjacent regions. In one particular embodiment, the intensity of radiation can be temporally or spatially varied across the width of the coating, affecting the local morphology, as described elsewhere. In one particular embodiment, a multilayer coating technique can be used, for example, where the regions include different ratios of polymeric binder to particles.

Several techniques can be used to impose the gradient structure, including, for example, techniques that modify dose; solvent modification techniques; chemical, coating and external techniques; and others that can be envisioned to one of skill in the art. Techniques that modify dose include, for example, light source techniques including temporal modification (pulse the LEDs), LED laser writing, control of different wavelength light sources, and video image (moves with the web); mask techniques including shadow masks, gray-scale masks, printed masks, and masks interior to a transparent roll with light source inside; and machine techniques including web speed variation, variation of distance or focus of light. Solvent modification techniques include, for example, temperature gradients; differential drying techniques including vacuum, flow, masked drying, and saturation of gas; and solvent coating techniques including coating in stripes of other patterns. Chemical techniques include, for example, patterned photoinitiator and patterned photoinhibitor including chemical additives, gasses, and oxygen inhibition. Coating techniques include, for example, stripe coating and pattern overcoating. External techniques include, for example, applied fields such as, for example, electric or magnetic or the like.

In general, any desired pattern can be generated by combinations of the described techniques, including, for example, indicia such as letters, words, symbols, or even pictures. The patterns can also be continuous, discontinuous, monotonic, serpentine, any smoothly varying function; stripes; varying in the machine direction, the transverse direction, or both; gradients can form an image, logo, or text; and they can include patterned coatings and/or perforations.

Figure 1B:
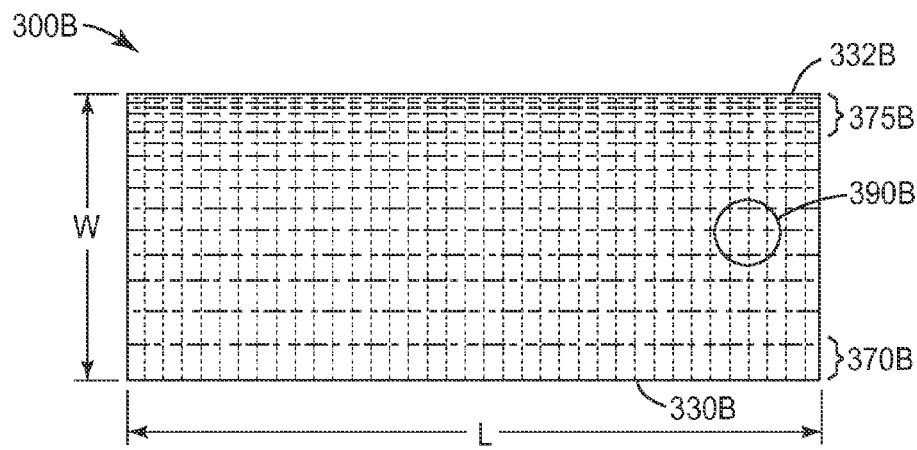
FIGS. 1B-1I are schematic top views of gradient optical films.

In FIG. 1B, gradient optical film 300B includes a length L and a width W that defines a transverse plane LW. Gradient optical film 300B further includes a local morphology 390B that varies along the transverse plane LW, for example, in a monotonic manner as shown. In one particular embodiment, a first local volume fraction of interconnected voids 370B proximate a first edge 330B of gradient optical film 300B is lower than a second local volume fraction of interconnected voids 375B proximate a second edge 332B of gradient optical film 300B, and varies monotonically between the edges. Gradient optical film 300B can be prepared using a variety of techniques, as described elsewhere.

Figure 1C:
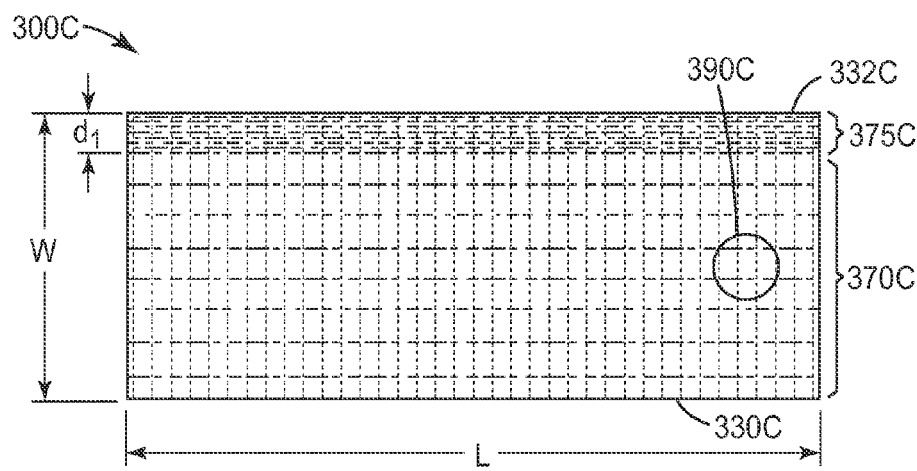

In FIG. 1C, gradient optical film 300C includes a length L and a width W that defines a transverse plane LW. Gradient optical film 300C further includes a local morphology 390C that varies along the transverse plane LW, for example, in a step-wise manner as shown. In one particular embodiment, a first local volume fraction of interconnected voids 370C proximate a first edge 330C of gradient optical film 300C is lower than a second local volume fraction of interconnected voids 375C proximate a second edge 332C of gradient optical film 300C. In some cases, for example, shown FIG. 1C, first local volume fraction of interconnected voids 370C transitions sharply (that is, step-wise) to second local volume fraction of interconnected voids 375C. In some cases, a line width d1 of the second volume fraction of interconnected voids 375C can be a small percentage of the width W, for example, from about 1% to about 5%, or to about 10%, or to about 20%, or to about 30% or more of the total width W. Any number of regions having the first local volume fraction of interconnected voids 370C can be formed across the width W of the gradient optical film 300C, as apparent to those of skill in the art. Gradient optical film 300C can be prepared using a variety of techniques, as described elsewhere.

Figure 1D:
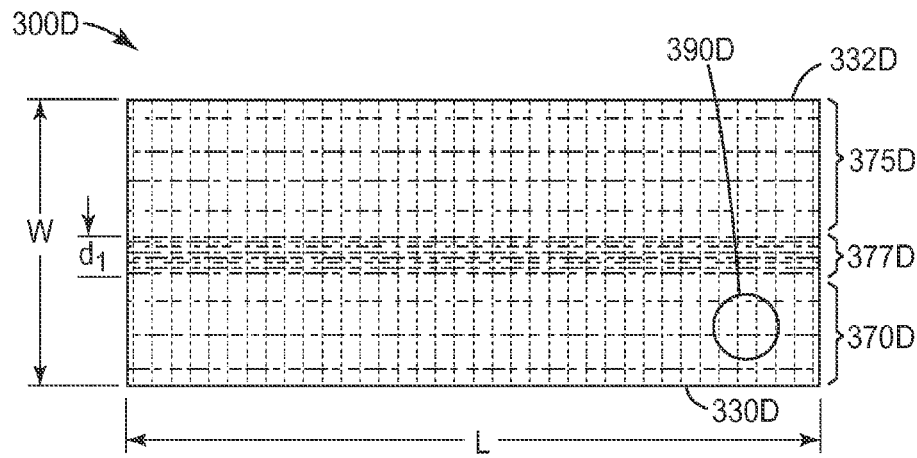

In FIG. 1D, gradient optical film 300D includes a length L and a width W that defines a transverse plane LW. Gradient optical film 300D further includes a local morphology 390D that varies along the transverse plane LW, for example, having a minimum local volume fraction of interconnected voids 377D as shown. In one particular embodiment, a first local volume fraction of interconnected voids 370D proximate a first edge 330D of gradient optical film 300D is approximately the same as a second local volume fraction of interconnected voids 375D proximate a second edge 332D of gradient optical film 300D. In some cases, for example, shown FIG. 1D, first local volume fraction of interconnected voids 370D transitions sharply (that is, step-wise) to minimum local volume fraction of interconnected voids 377D. In some cases, the transition can be abrupt, as in a step-change, or the transition can be smoothed slightly, for example, an "S" shaped transition (not shown). In some cases, a line width d1 of the minimum volume fraction of interconnected voids 377D can be a small percentage of the width W, for example, from about 1% to about 5%, or to about 10%, or to about 20%, or to about 30% or more of the width W. In some cases, the relative position of the minimum local volume fraction of interconnected voids 377D can be located anywhere, and in multiple positions across the width W. Gradient optical film 300D can be prepared using a variety of techniques, as described elsewhere.

Figure 1E:
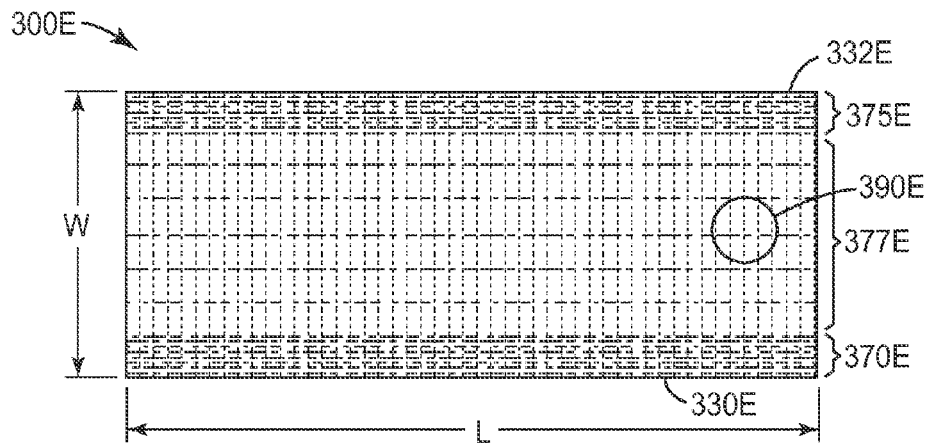

In FIG. 1E, gradient optical film includes a length L and a width W that defines a transverse plane LW. Gradient optical film 300E further includes a local morphology 390E that varies along the transverse plane LW, for example, having a step-change local volume fraction of interconnected voids proximate a first and a second edge 330E, 332E, as shown. In one particular embodiment, a first local volume fraction of interconnected voids 370E proximate a first edge 330E of gradient optical film 300E is approximately the same as a second local volume fraction of interconnected voids 375E proximate a second edge 332E of gradient optical film 300E. In some cases, for example, shown FIG. 1E, first local volume fraction of interconnected voids 370E transitions sharply (that is, step-wise) to maximum local volume fraction of interconnected voids 377E. In some cases, each of the first and second local volume fraction of interconnected voids 370E and 375E can have transitions that are not step-wise (not shown, but similar to the monotonic variation shown in FIG. 1B). Gradient optical film 300E can be prepared using a variety of techniques, as described elsewhere.

Figure 1F:
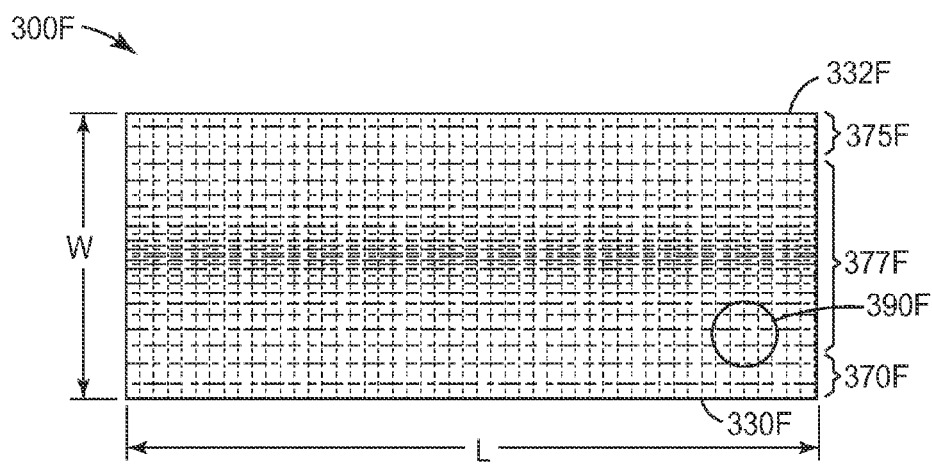

In FIG. 1F, gradient optical film 300F includes a length L and a width W that defines a transverse plane LW. Gradient optical film 300F further includes a local morphology 390F that varies along the transverse plane LW, for example, having a gradient minimum local volume fraction of interconnected voids 377F as shown. In one particular embodiment, a first local volume fraction of interconnected voids 370F proximate a first edge 330F of gradient optical film 300F is approximately the same as a second local volume fraction of interconnected voids 375F proximate a second edge 332F of gradient optical film 300F. In some cases, for example, shown FIG. 1F, first local volume fraction of interconnected voids 370F transitions gradually (that is, in a monotonic gradient) to a minimum local volume fraction of interconnected voids 377F, and again transitions gradually to the second volume fraction of interconnected voids 375F. Gradient optical film 300F can be prepared using a variety of techniques, as described elsewhere.

Figure 1G:
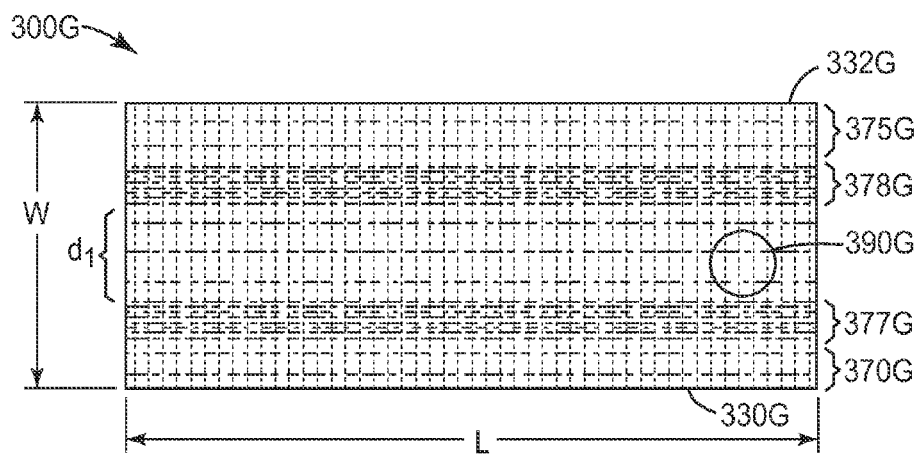

In FIG. 1G, gradient optical film 300G includes a length L and a width W that defines a transverse plane LW. Gradient optical film 300G further includes a local morphology 390G that varies along the transverse plane LW, for example, having a pair of step-change local volume fraction of interconnected voids 377G, 378G, as shown. In one particular embodiment, a first local volume fraction of interconnected voids 370G proximate a first edge 330G of gradient optical film 300G is approximately the same as a second local volume fraction of interconnected voids 375G proximate a second edge 332G of gradient optical film 300G. In some cases, for example, shown FIG. 1G, first local volume fraction of interconnected voids 370G transitions sharply (that is, step-wise) to minimum local volume fraction of interconnected voids 377G, transitions sharply again to a maximum local volume fraction of interconnected voids 380G, transitions sharply again to a minimum local volume fraction of interconnected voids 378G, and finally transitions sharply yet again to the second local volume fraction of interconnected voids 375G. In some cases, each of the local volume fraction of interconnected voids can have transitions that are not step-wise (not shown, but similar to the monotonic variation shown in FIG. 1B). Gradient optical film 300G can be prepared using a variety of techniques, as described elsewhere.

Figure 1H:
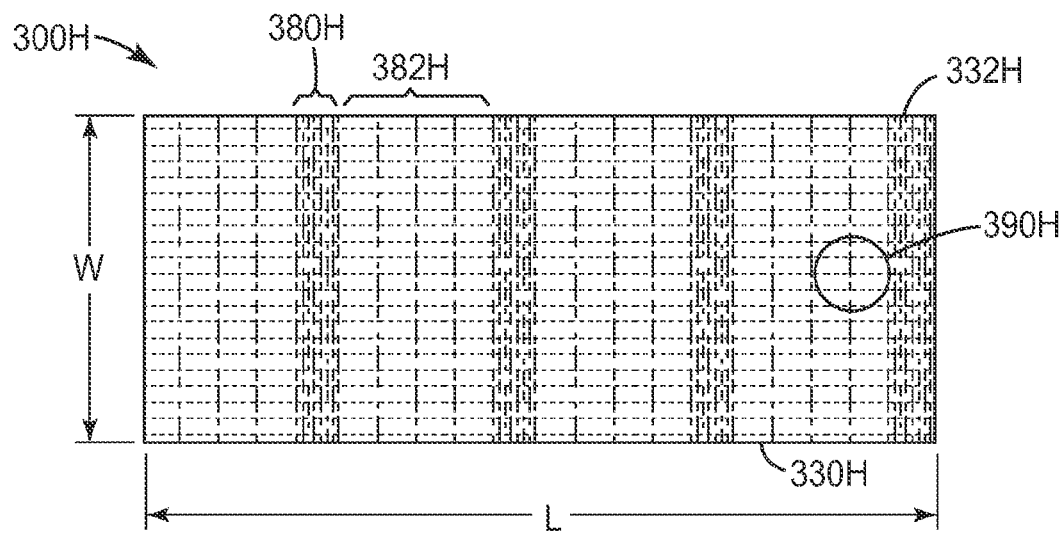

In FIG. 1H, gradient optical film 300H includes a length L and a width W that defines a transverse plane LW. Gradient optical film 300H further includes a local morphology 390H that varies along the transverse plane LW, for example, having a step-change local volume fraction of interconnected voids 380H, 382H that change along the length L of the gradient optical film 300H, as shown. In one particular embodiment, a first local volume fraction of interconnected voids 380H is perpendicular to both a first edge 330H and a second edge 332H of gradient optical film 300G, and a second local volume fraction of interconnected voids 382H is also perpendicular to the first and second edges 330H, 332H of gradient optical film 300G. In some cases, for example, shown FIG. 1H, first local volume fraction of interconnected voids 380H transitions sharply (that is, step-wise) to minimum local volume fraction of interconnected voids 382H, and continues in a like fashion down the length L of the gradient optical film. In some cases, each of the local volume fraction of interconnected voids can have transitions that are not step-wise (not shown, but similar to the monotonic variation shown in FIG. 1B). Gradient optical film 300H can be prepared using a variety of techniques, as described elsewhere.

Figure 1I:
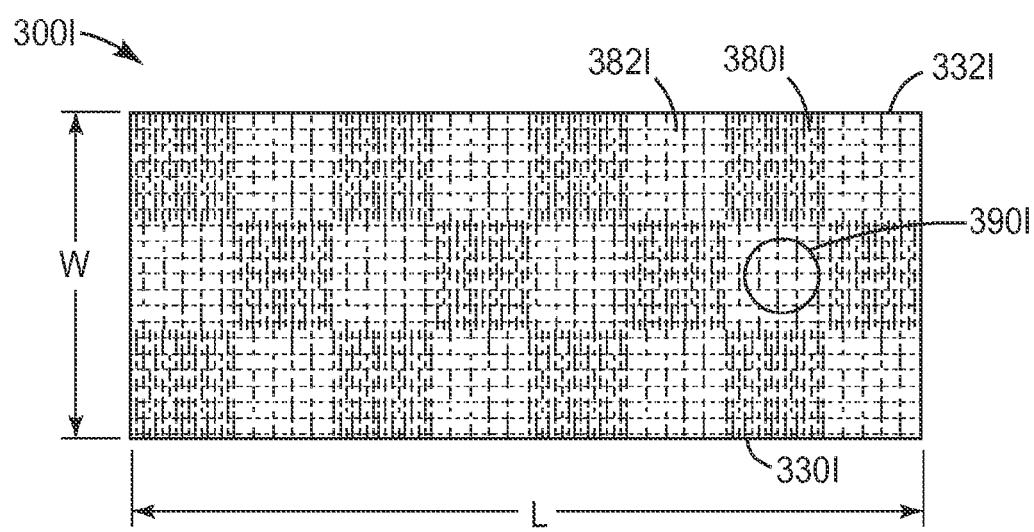

In FIG. 1I, gradient optical film 300I includes a length L and a width W that defines a transverse plane LW. Gradient optical film 300I further includes a local morphology 390I that varies along the transverse plane LW, for example, having a step-change local volume fraction of interconnected voids 380I, 382I that change in a checkerboard fashion, as shown. It is to be understood that any desired pattern can be formed across the transverse plane, including, for example, geometric shapes, words, indicia, images, and the like. In one particular embodiment, for example shown FIG. 1I, first local volume fraction of interconnected voids 380I transitions sharply (that is, step-wise) to minimum local volume fraction of interconnected voids 382I, and continues in a like fashion across the transverse plane LW of the gradient optical film. In some cases, each of the local volume fraction of interconnected voids can have transitions that are not step-wise (not shown, but similar to the monotonic variation shown in FIG. 1B). Gradient optical film 300I can be prepared using a variety of techniques, as described elsewhere.

Figure 2:
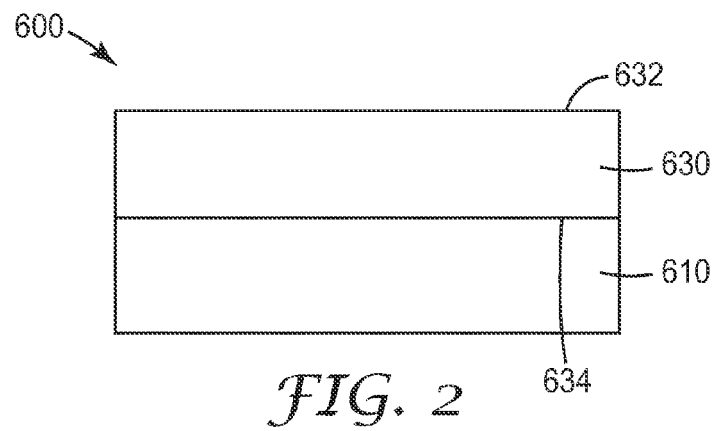
FIG. 2 is a schematic side-view of an optical construction.

FIG. 2 is a schematic side-view of an optical construction 600 that includes a gradient optical film 630 disposed on a substrate 610. In some cases, substrate 610 is a release liner that provides a transferable gradient optical film 630, meaning that, for example, the exposed top major surface 632 of the gradient optical film 630 may be placed in contact with a substrate or surface and the release liner may thereafter be stripped away from the gradient optical film to expose a bottom major surface 634 of the gradient optical film that can, for example, be bonded to another substrate or surface. The release force for releasing low index layer 630 from a release liner 610 is generally less than about 200 g-force/inch, or less than about 150 g-force/inch, or less than about 100 g-force/inch, or less than about 75 g-force/inch, or less than about 50 g-force/inch.

Gradient optical film 630 can be similar to any gradient optical film disclosed herein. For example, gradient optical film 630 can be similar to one of gradient optical films 300A-300I. In some cases, gradient optical film 630 can include multiple layers, where one or more layers is similar to one of gradient optical films 300A-300I, one or more layers includes a "z" gradient film as described elsewhere, or one or more layers includes a non-gradient film, or a combination of gradient films and non-gradient films. In some cases, one of gradient optical films 300A-300I may be coated directly onto substrate 610. In some cases, one of gradient optical films 300A-300I may be first formed and thereafter transferred onto substrate 610. Substrate 610 can be translucent, transparent, or opaque.

Substrate 610 can be or include any material that may be suitable in an application, such as a dielectric, a semiconductor, or a conductor (such as a metal). For example, substrate 610 can include or be made of glass and polymers such as polyethylene terapthalate (PET), polycarbonates, and acrylics. In some cases, the substrate 610 can include a polarizer such as a reflective polarizer, an absorbing polarizer, a wire-grid polarizer, or a fiber polarizer. In some case, the substrate 610 can include multiple layers, such as a multilayer optical film including, for example, multilayer reflecting films and multilayer polarizing films. In some cases, the substrate 610 can include a structured surface, such as a surface having a plurality of microstructures including, for example, vee-grooves such as a Brightness Enhancing Film (BEF), cube-corners, such as a retroreflector, or other microstructures as known in the art. In some cases, the substrate 610 can include further coatings on a major surface such as, for example, a primer coating or an adhesive coating.

As used herein, a fiber polarizer includes a plurality of substantially parallel fibers that form one or more layers of fibers embedded within a binder with at least one of the binder and the fibers including a birefringent material. The substantially parallel fibers define a transmission axis and a reflection axis. The fiber polarizer substantially transmits incident light that is polarized parallel to the transmission axis and substantially reflects incident light that is polarized parallel to the reflection axis. Examples of fiber polarizers are described in, for example, U.S. Pat. Nos. 7,599,592 and 7,526,164, the entireties of which are incorporated herein by reference.

In some cases, the substrate 610 can include a partial reflector. A partial reflector is an optical element or a collection of optical elements which reflect at least 30% of incident light while transmitting the remainder, minus absorption losses. Suitable partial reflectors include, for example, foams, polarizing and non-polarizing multilayer optical films, microreplictated structures (for example BEF), polarized and non-polarized blends, wire grid polarizers, partially transmissive metals such as silver or nickel, metal/dielectric stacks such as silver and indium tin oxide, and asymmetric optical films. Asymmetric optical films are described, for example, in U.S. Pat. No. 6,924,014 (Ouderkirk et al.) and also in PCT Publication WO2008/144636. Also useful as partial reflectors are perforated partial reflectors or mirrors, such as, for example, perforating ESR (available from 3M Company).

In one particular embodiment, substrate 610 can be a reflective polarizer. A reflective polarizer layer substantially reflects light that has a first polarization state and substantially transmits light that has a second polarization state, where the two polarization states are mutually orthogonal. For example, the average reflectance of a reflective polarizer in the visible for the polarization state that is substantially reflected by the reflective polarizer is at least about 50%, or at least about 60%, or at least about 70%, or at least about 80%, or at least about 90%, or at least about 95%. As another example, the average transmittance of a reflective polarizer in the visible for the polarization state that is substantially transmitted by the reflective polarizer is at least about 50%, or at least about 60%, or at least about 70%, or at least about 80%, or at least about 90%, or at least about 95%, or at least about 97%, or at least about 98%, or at least about 99%. In some cases, the reflective polarizer substantially reflects light having a first linear polarization state (for example, along the x-direction) and substantially transmits light having a second linear polarization state (for example, along the z-direction).

Any suitable type of reflective polarizer may be used such as, for example, a multilayer optical film (MOF) reflective polarizer such as Vikuiti™ Dual Brightness Enhancement Film (DBEF), a diffusely reflective polarizing film (DRPF) having a continuous phase and a disperse phase, such as a Vikuiti™ Diffuse Reflective Polarizer Film ("DRPF") available from 3M Company, St. Paul, Minn., a wire grid reflective polarizer described in, for example, U.S. Pat. No. 6,719,426, or a cholesteric reflective polarizer.

For example, in some cases, the reflective polarizer layer can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through the reflective polarizer and an incident light in the unmatched polarization state is substantially reflected by reflective polarizer. In some cases, an MOF reflective polarizer can include a stack of inorganic dielectric layers.

As another example, the reflective polarizer can be or include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane. Such partially reflecting layers are described in, for example, U.S. Patent Publication No. 2008/064133, the disclosure of which is incorporated herein in its entirety by reference.

In some cases, the reflective polarizer can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

In some cases, the reflective polarizer can be a multilayer optical film that reflects or transmits light by optical interference, such as those described in Provisional U.S. Patent Application No. 61/116,132, filed Nov. 19, 2008; Provisional U.S. Patent Application No. 61/116,291, filed Nov. 19, 2008; Provisional U.S. Patent Application No. 61/116,294, filed Nov. 19, 2008; Provisional U.S. Patent Application No. 61/116,295, filed Nov. 19, 2008; Provisional U.S. Patent Application No. 61/116,295, filed Nov. 19, 2008; and International Patent Application No. PCT/US 2008/060311, filed May 19, 2008, claiming priority from Provisional U.S. Patent Application No. 60/939,085, filed May 20, 2007; all incorporated herein by reference in their entirety.

In one particular embodiment, substrate 610 can be a microstructured surface, such as a prismatic light directing film. For example, gradient optical film 630 can be coated on the prism side of a light redirecting film such as Vikuiti™ Brightness Enhancing Film (BEF), available from 3M Company. The BEF includes a plurality of linear prisms with, for example, a 24 micron pitch and a prism peak or apex angle of about 90 degrees. The gradient optical film 630 can be coated on the microstructured surface as a conformal coating, a planarized coating, or pattern coated, as known to those of skill in the art.

Substantial portions of each two neighboring major surfaces in optical construction 600 are in physical contact with each other along the bottom major surface 634 of gradient optical film 630. For example, at least 50%, or at least 60%, or at least 70%, or at least 80%, or at least 90%, or at least 95% of the two neighboring major surfaces are in physical contact with each other. For example, in some cases, gradient optical film 630 is coated directly on substrate 610.

Figure 3:
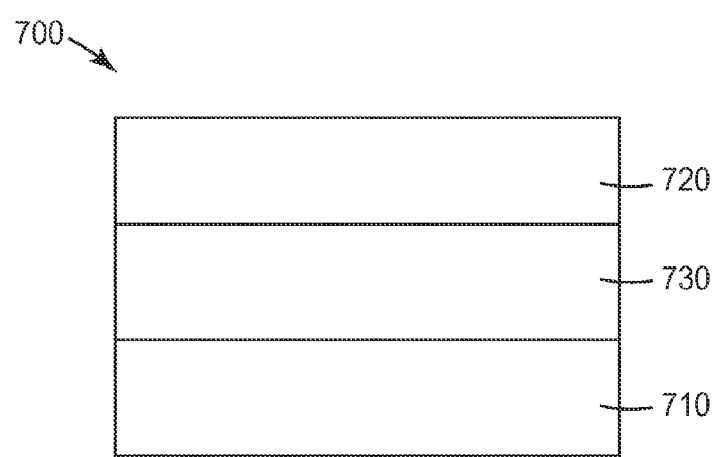
FIG. 3 is a schematic side-view of an optical construction.

FIG. 3 is a schematic side-view of an optical construction 700 that includes a gradient optical film 730 disposed on a substrate 710, and an optical adhesive layer 720 disposed on gradient optical film 730. Substrate 710 can be any of the substrates described elsewhere, including, for example, a substrate such as substrate 610 described with reference to FIG. 2. In some cases the optical adhesive layer 720 can act as a sealer to inhibit infiltration of voids of gradient optical film 730. In some cases, it may be desirable to have optical adhesive layer 720 and gradient optical film 730 on opposite sides of the substrate 710. In other cases, it may be desirable to have gradient optical film 730 on both sides of substrate 710.

Optical adhesive layer 720 can be any optical adhesive that may be desirable and/or available in an application. Optical adhesive layer 720 is of sufficient optical quality and light stability such that, for example, the adhesive layer does not yellow with time or upon exposure to weather so as to degrade the optical performance of the adhesive and the gradient optical film. In some cases, optical adhesive layer 720 can be a substantially clear optical adhesive meaning that the adhesive layer has a high specular transmittance and a low diffuse transmittance. For example, in such cases, the specular transmittance of optical adhesive layer 720 is not less than about 70%, or not less than about 80%, or not less than about 90%, or not less than about 95%.

In some cases, optical adhesive layer 720 is substantially optically diffusive, meaning that the adhesive layer has a high diffuse transmittance and a low specular transmittance, and the optical adhesive layer 720 can have a white appearance. For example, in such cases, the optical haze of an optically diffusive adhesive layer 720 is not less than about 30%, or not less than about 30%, or not less than about 50%, or not less than about 60%, or not less than about 70%, or not less than about 80%, or not less than about 90%, or not less than about 95%. In some case, the diffuse reflectance of the diffusive adhesive layer is not less than about 20%, or not less than about 30%, or not less than about 40%, or not less than about 50%, or not less than about 60%. In such cases, the adhesive layer can be optically diffusive by including a plurality of particles dispersed in an optical adhesive where the particles and the optical adhesive have different indices of refraction. The mismatch between the two indices of refraction can result in light scattering.

Exemplary optical adhesives include pressure sensitive adhesives (PSAs), heat-sensitive adhesives, solvent-volatile adhesives, repositionable adhesives or reworkable adhesives, and UV-curable adhesives such as UV-curable optical adhesives available from Norland Products, Inc.

Exemplary PSAs include those based on natural rubbers, synthetic rubbers, styrene block copolymers, (meth)acrylic block copolymers, polyvinyl ethers, polyolefins, and poly (meth)acrylates. As used herein, (meth)acrylic (or acrylate)

refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and an optional tackifier.

Gradient optical film 730 can be similar to any gradient optical film disclosed herein. For example, gradient optical film 730 can be similar to one of gradient optical films 300A-300I. As another example, gradient optical film 730 can include multiple layers, where each layer is similar to one of gradient optical films 300A-300I.

In one particular embodiment, an optional optical diffuser (not shown) can be disposed on the optical adhesive layer 720, forming a stack of optical diffuser/optical adhesive/gradient optical film/substrate. The optional optical diffuser can include any optical diffuser that may be desirable and/or available in an application. For example, the optical diffuser can be or include a surface diffuser, a volume diffuser, or a combination thereof. For example, the optional optical diffuser can include a plurality of particles having a first index of refraction $n_1$ dispersed in a binder or host medium having a different index of refraction $n_2$, where the difference between the two indices of refraction is at least about 0.01, or at least about 0.02, or at least about 0.03, or at least about 0.04, or at least about 0.05.

Figure 4:
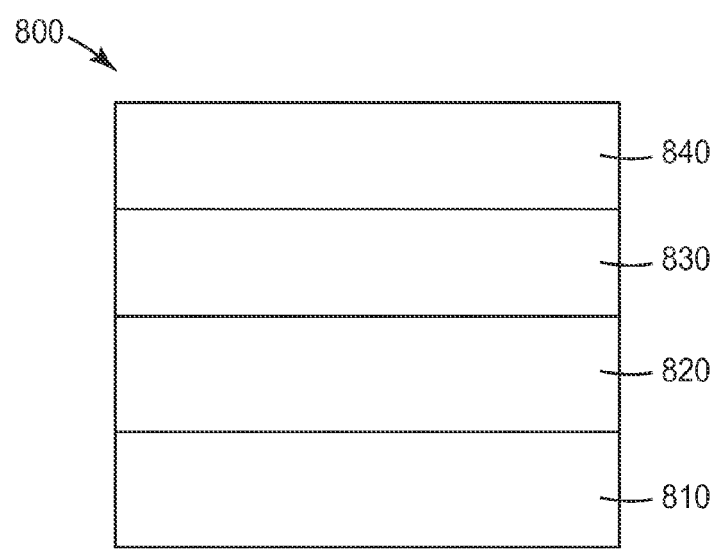
FIG. 4 is a schematic side-view of an optical construction.

FIG. 4 is a schematic side-view of an optical construction 800 that includes a first optical adhesive layer 820 disposed on a substrate 810, a gradient optical film 830 disposed on first optical adhesive layer 820, and an optional second optical adhesive layer 840 disposed on gradient optical film 830. Substrate 810 can be any of the substrates described elsewhere, including, for example, a substrate such as substrate 610 described with reference to FIG. 2. Optical adhesive layers 820 and 840 can be similar to optical adhesive layer 720. In some cases, optical adhesive layers 820 and 840 have the same index of refraction. In some cases, the two adhesive layers can have different indices of refraction.

Gradient optical film 830 can be similar to any gradient optical film disclosed herein. For example, gradient optical film 830 can be similar to one of gradient optical films 300A-300I. As another example, gradient optical film 830 can include multiple layers, where each layer is similar to one of gradient optical films 300A-300I.

Figure 8:
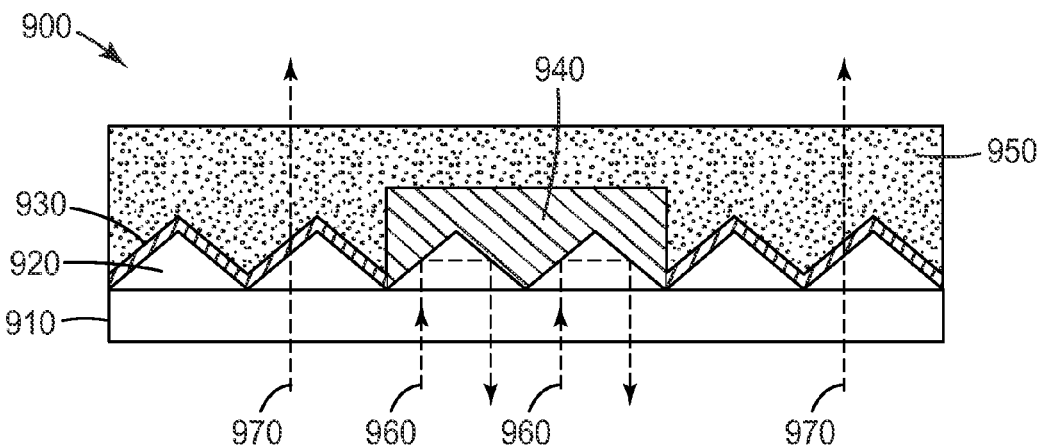
FIG. 8 is a schematic cross-section of a patterned retroreflector.

FIG. 8 is a schematic cross-section of a patterned retroreflector 900 according to one aspect of the disclosure. Patterned retroreflector 900 includes a substrate 910 having an array of cube-corner retroreflectors 920. A first region 930 includes a high index material adjacent to the cube-corner retroreflectors 920. A second region 940 that includes a low index material adjacent to the cube-corner retroreflectors 920, is adjacent to the first region 930. The first and second regions 930, 940, are polymer gradient films that can be prepared and patterned according to the methods described elsewhere. A pigmented coating 950 can be disposed over the first region 930 and the second region 940. A first light ray 960 incident on the cube-corner retroreflectors 920 adjacent the second region 940, retroreflects as shown. A second light ray 970 incident on the cube-corner retroreflectors adjacent the first region 930 does not retroreflect, and instead shows the pigmented coating 950 adjacent the first region 930.

Figure 9:
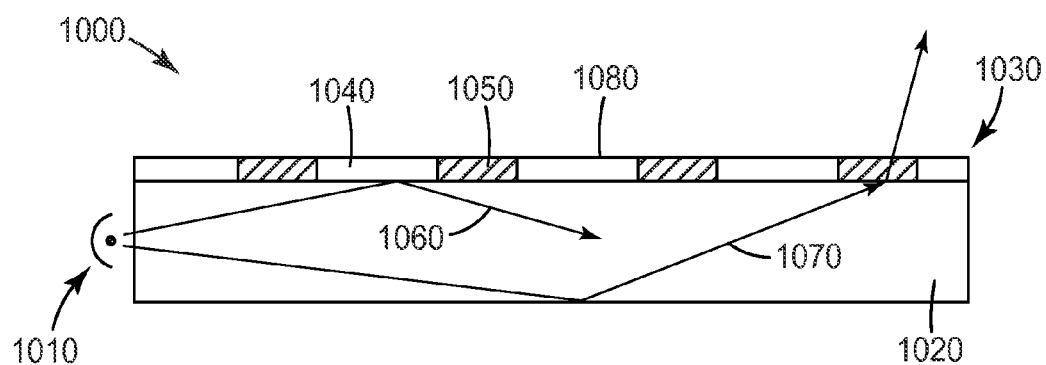
FIG. 9 is a schematic cross-section of a patterned light guide.

FIG. 9 is a schematic cross-section of a patterned light guide 1000, according to one aspect of the disclosure. Patterned light guide 1000 includes a light source 1010 capable of injecting light into a light guide 1020. Light guide 1020 can be a hollow light guide or a solid light guide, as described elsewhere. Light guide 1020 includes a gradient polymer film 1030 that can be prepared as described elsewhere, such that a first region 1040 includes a lower index material than the index of the light guide 1020, and a second adjacent region 1050 includes a material having an index that is not lower than the index of the light guide 1020. Since light guide 1020 enables propagation of light by TIR, a first light ray 1060 is shown to undergo TIR adjacent the first region 1040, and a second light ray 1070 is shown to be directed out of the light guide, since TIR is frustrated in the second region 1050. In some cases, the index of the second adjacent region 1050 can be essentially the same as the index of the light guide 1020, and second light ray 1070 will exit the light guide without a change in direction, as known to one of skill in the art. Various extractor elements can be positioned adjacent the top surface 1080 of the gradient polymer film 1030 to direct the light that escapes the light guide, as known to one of skill in the art.

In some cases, the disclosed gradients can be combined in any fashion desired, to create X (downweb), Y (crossweb), XY, XZ, YZ, and XYZ gradient combinations. They can also be combined with any desired surface patterning, and applied to different substrates including, for example, PET, Polycarbonate, MOF, microreplicated optical films, and the like.

In some cases, substrate can be at least one of a release liner, an adhesive, a volume diffuser, a surface diffuser, a diffractive diffuser, a refractive diffuser, a retroreflector, an absorbing polarizer, a reflective polarizer, a fiber polarizer, a cholesteric polarizer, a multilayer polarizer, a wire grid polarizer, a partial reflector, a volume reflector, a multilayer polymer reflector, a metal reflector, a metal/dielectric multilayer reflector, a fiber, a lens, a microstructure, a solid light guide, or a hollow light guide. In some cases, the microstructure can be a retroreflector, a brightness enhancing film (BEF), a lenslet, a gain diffuser, a light extraction film, or a turning film.

In some cases, a gradient polymeric film can include multiple layers, where one or more layers is similar to one of gradient optical films 300A-300I, one or more layers includes a "z" gradient film as described elsewhere, or one or more layers includes a non-gradient film, or a combination of gradient films and non-gradient films. In some cases, the gradient polymeric film can include a combination of layers that are low haze/high haze/low haze. Generally, such other layers in a multilayer coating can include, for example, a volume diffuser, porous coatings, diffuse porous coatings, sealants, primer, adhesives and the like. The multilayer coating layer can be the surface layer of a subsurface layer of a multilayer coating stack. Generally, a multilayer coating can be produced either simultaneously or sequentially, as known to one of skill in the art.

In one particular embodiment, a graded optical film having a patterned difference in the refractive index can be useful for light extraction. Such a graded optical film can enable selective transmission from, for example, a light guide to a light re-directing element. A lightguide propagates light across an area due to total internal reflection (TIR) from the surfaces of the lightguide. TIR occurs where there is a large index difference from the guide to the surrounding medium. A gradient optical film having regions of low index alternating with regions of similar index that is laminated to the light guide, can cause light to undergo selective TIR where the index is low, but light can be allowed to escape the guide where the higher index region is. Typically, this controlled extraction can be used to meter the light to a light re-directing element including prisms, gain diffusers, turning films, or other such structure as known in the art. In some cases, light re-directing elements could either be microreplicated, or an angle selective MOF.

The disclosed gradient films can be used in applications including, for example, light guide variable extractors including solid light guide extractors, hollow (air) guide extractors, fibers and the like; gradient haze films useful, for example, for defect and/or bulb hiding, particularly in backlit displays; variable diffusers; variable absorbers; variable reflectors including enhanced specular reflectors (ESR) for daylighting; and the like.

EXAMPLES

In the examples that follow, the transmission, haze, and clarity were measured using a BYK-Gardner Haze-Gard Plus haze meter (available from BYK-Gardner, Silver Springs, Md.). Unless otherwise specified, all chemicals are available from Aldrich Chemical, Milwaukee, Wis. The refractive index (RI) of the coating was measured using a Model 2010 Prism Coupler (available from Metricon Corporation, Pennington N.J.). The Model 2010 Metricon was configured with a HeNe laser operating at a wavelength of 632.8 nm and an optical prism (code 6567.9). The measurements were made in both the TE and TM modes. To determine the film side refractive index of the coating, the sample was loaded such that the substrate was in intimate contact with the prism coupler. To determine the air side refractive index of the coating, the sample was loaded such that the coating was in intimate contact with the prism coupler.

Figure 5:
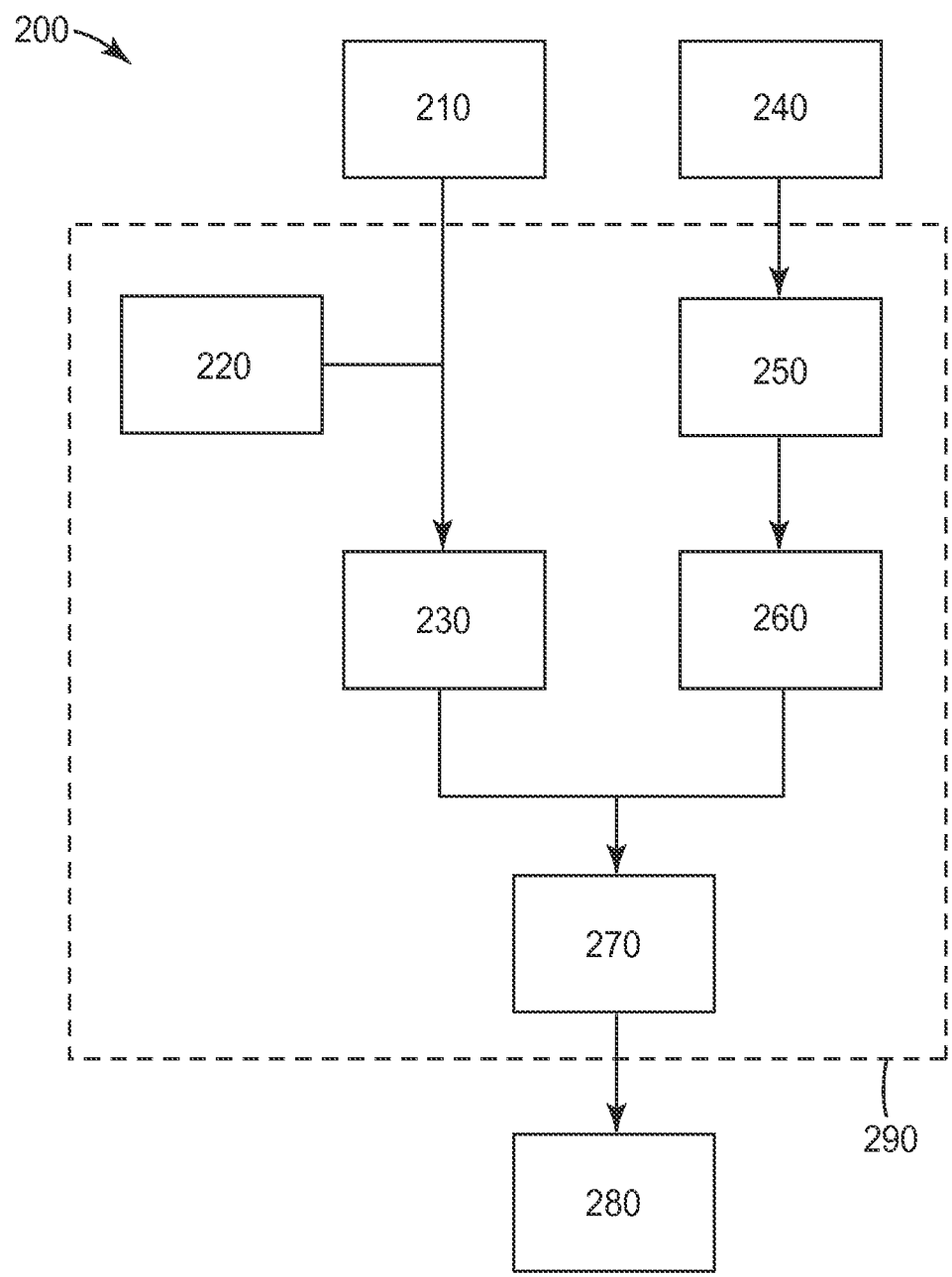
FIG. 5 is a process schematic.

FIG. 5 shows a schematic of a process 200 used to program and control the lamps (in this case, the UV LEDs) to generate, for example, a temporal gradient, according to one aspect of the disclosure. Process 200 includes a first step 210 that generated an Amps vs % Haze (or other desired control curve, such as, for example, % T, % C, or refractive index) curve, a second step 220 that generated a control voltage vs Amps curve, and a third step 230 that converted Amps to control voltage to result in the control voltage vs % Haze curve. As a result, in steps 210-230 shown in FIG. 5, the voltage vs haze (or alternately voltage vs % T) curve was created by creating samples of high haze GEL at control lamp voltages from 0V to 10V in steps of 0.5V. Process 200 further includes a fourth step 240 in which the required % Haze gradient was defined, a fifth step 250 that fitted a function to the required % Haze gradient, and a sixth step 260 that interpolated the desired gradient to obtain the % Haze at a short time interval, for example, about 0.1 seconds. As a result, in steps 240-260, the required haze gradient was defined based on the final intended use of the gradient. The required curve was then fit with a polynomial describing the curve in Matlab (available from The MathWorks, Natick, Mass.). This function was then used to interpolate points between the required haze gradient curve at intervals of 0.001 inches (25.4 microns). Second, third, fifth, sixth, and seventh steps 220, 230, 250, 260, and 270 in process 200 typically reside in a software program 290. Process 200 still further includes a seventh step 270 that combined the control voltage vs % Haze curve from third step 230 with the interpolated desired gradient that provided the % Haze at short time intervals from sixth step 260. As a result, in seventh step 270, the control voltage vs haze curve was then used to calculate the voltage required at each position to obtain the required haze value. Process 200 further includes an eighth step 280 that applied the required voltage gradient to the lamps, using the result from seventh step 270. As a result, in eighth step 280, the voltage curve was applied to the lamps during the creation of the sample.

Preparation of Coating Solution "A"

Nalco 2327 (400 g) (20 nm colloidal silica dispersion available from Nalco, Naperville Ill.) was charged to a 1 qt jar. 1-methoxy-2-propanol (450 g), trimethoxy(2,4,4-trimethylpentyl)silane (11.95 g) (available from Waker Silicones Adrian Mich.), 4-(Triethoxysilyl)-butyronitrile (11.85 g) and 5% Prostab 5128 in water (0.23 g) (available from Ciba Specialties Chemical, Inc Tarrytown, N.Y.) were mixed together and added to the colloidal dispersion while stirring. The jar was sealed and heated to 8° C. for 16 hr.

The resulting solution was allowed to cool down to room temperature. The above dispersion (606.7 g) and 1-methoxy-2-propanol (102.3 g) were charged to a 1000 ml RB flask. Water and 1-methoxy-2-propanol were removed via rotary evaporation to a weight of 314.8 g. Additional dispersion (258.61 g) and 1-methoxy-2-propanol (202.0 g) were charged to the flask. Water and 1-methoxy-2-propanol were removed via rotary evaporation to give a weight of 343.69 g. 1-methoxy-2-propanol (89.2 g) was added to give an approximately 43 wt % solids dispersion of surface modified 20 nm silica in 1-methoxy-2-propanol.

The resulting solution was 43% wt modified 20 nm silica dispersed in 1-methoxy-2-propanol. Next, 100 g of this solution, 64.5 g of SR 444 (available from Sartomer Company, Exton Pa.), 2.15 g of photoinitiator Irgacure 184 (available from Ciba Specialty Chemicals Company, High Point N.C.), and 167.2 g of isopropyl alcohol and 26.6 g of 1-methoxy-2-propanol were mixed together by stirring to form a homogenous coating solution A (30% solids coating solution).

Preparation of Coating Solution "B"

A coating solution "B" was made. First, 360 g of Nalco 2327 colloidal silica particles (40% wt solid and an average particle diameter of about 20 nanometers) (available from Nalco Chemical Company, Naperville Ill.) and 300 g of solvent 1-methoxy-2-propanol were mixed together under rapid stirring in a 2-liter three-neck flask that was equipped with a condenser and a thermometer. Next, 22.15 g of Silquest A-174 silane (available from GE Advanced Materials, Wilton Conn.) was added. The mixture was stirred for 10 min. Next, an additional 400 g of 1-methoxy-2-propanol was added. The mixture was heated at 85° C. for 6 hours using a heating mantle. The resulting solution was allowed to cool down to room temperature. Next, most of water and 1-methoxy-2-propanol solvents (about 700 g) were removed using a rotary evaporator under a 60° C. water-bath.

The resulting solution was 43% wt A-174 modified 20 nm silica clear dispersed in 1-methoxy-2-propanol. Next, 82.65 g of this solution, 24 g of SR 444 (available from Sartomer Company, Exton Pa.), 0.119 g of photoinitiator Irgacure 819 (available from Ciba Specialty Chemicals Company, High Point N.C.), and 91.7 g of isopropyl alcohol were mixed together by stirring to form a homogenous coating solution B (30% solids coating solution).

Example 1

Downweb Gradients of Haze and Transmission

Example 1 demonstrates downweb gradients of haze while holding the percent transmission at a constant value, and downweb gradients of transmission while holding haze constant.

Generation of Calibration Curve:

The coating solution "A" was syringe-pumped at a rate of 2.5 cc/min into a 10.15 cm (4-inch) wide slot-type coating die. The slot coating die uniformly distributed a 10.15 cm wide coating onto a PET substrate moving at 5 ft/min (152 cm/min).

The coating was then polymerized by passing the coated substrate through a UV-LED cure chamber that included a quartz window to allow passage of UV radiation. The UV-LED bank included a rectangular array of 352 UV-LEDs, 16 down-web by 22 cross-web (approximately covering a 20.3 cm×20.3 cm area). The UV-LEDs were placed on two water-cooled heat sinks. The LEDs (available from Cree, Inc., Durham N.C.) operated at a nominal wavelength of 395 nm, and were run at 45 Volts at 13 Amps. The UV-LED array was powered and fan-cooled by a TENMA 72-6910 (42V/10A) power supply (available from Tenma, Springboro Ohio). The UV-LEDs were positioned above the cure chamber quartz window at a distance of approximately 2.54 cm from the substrate. The UV-LED cure chamber was supplied with a flow of nitrogen at a flow rate of 46.7 liters/min (100 cfh) resulting in an oxygen concentration of approximately 150 ppm in the cure chamber. The oxygen concentration in all cases was measured using a sensor located below the quartz window in the cure chamber, in the center of the coated width at a distance of approximately ¼" (6.4 mm) from the coating.

After being polymerized by the UV-LEDs, the solvent in the cured coating was removed by transporting the coating to a drying oven operating at 150° F. (66 C) for 2 minutes at a web speed of 5 ft/min. Next, the dried coating was post-cured using a Fusion System Model I300P configured with an H-bulb (available from Fusion UV Systems, Gaithersburg Md.), operated at full power. The UV Fusion chamber was supplied with a flow of nitrogen that resulted in an oxygen concentration of approximately 50 ppm in the chamber.

Figure 6A:
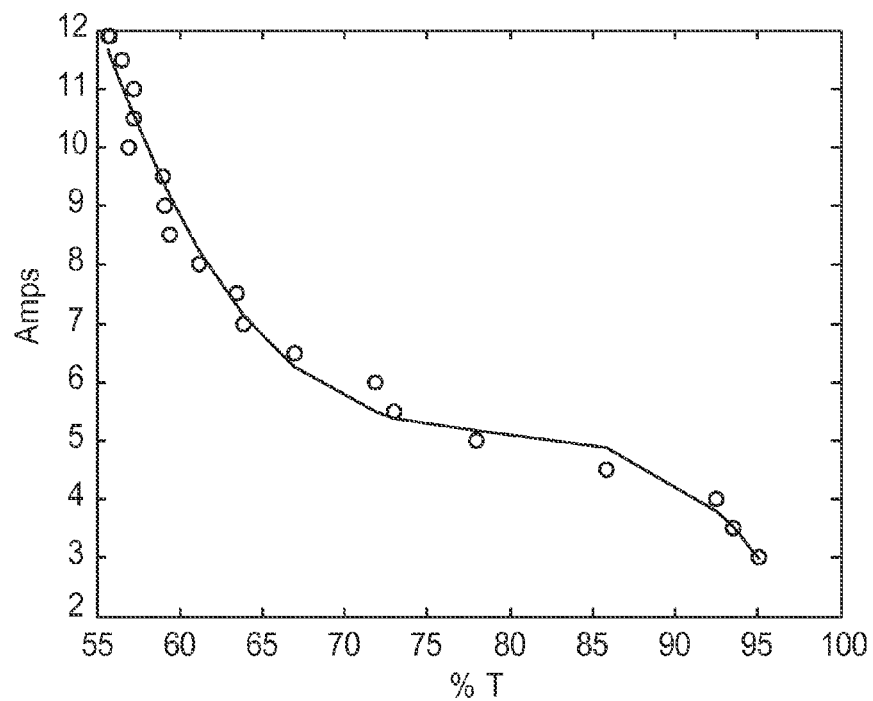
FIG. 6A is a graph of Amps vs % T.
Figure 6B:
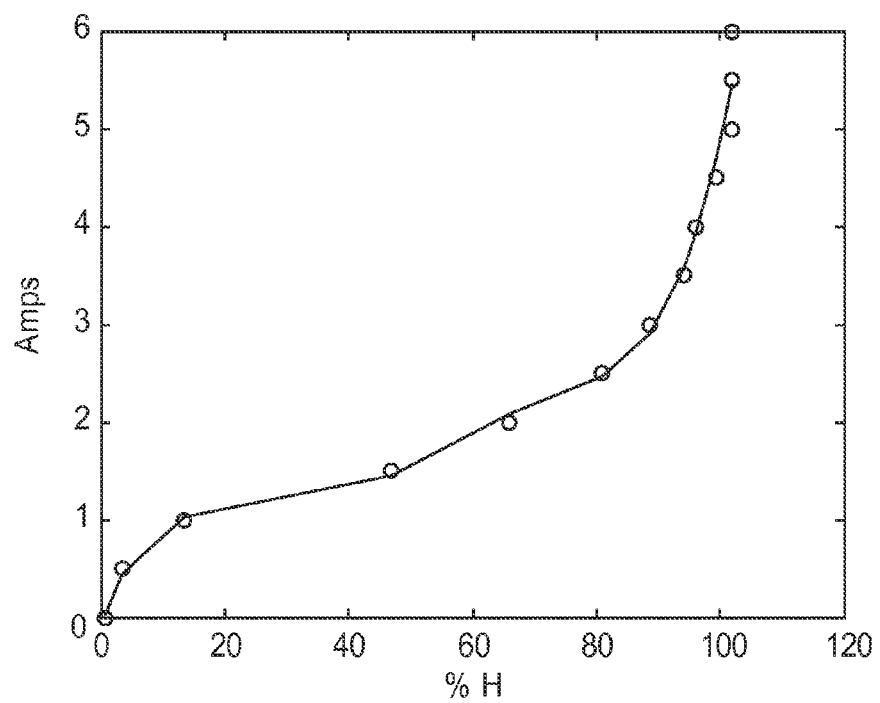
FIG. 6B is a graph of Amps vs % H.

The power supply was controlled by applying a control voltage to the power supply's input pin with a Compaq 6910p laptop and a DAQCard-6062E PCMCIA Multifunction I/O card (National Instruments, Austin, Tex.) controlled with LabView software (National Instruments, Austin Tex.). Samples were created with control voltages ranging from 0 to 10 V in steps of 0.5 volts, these voltages corresponding to output amps at the lamp of from 0 to 12 Amps. The percent transmission (% T), haze (% H) and clarity (% C) were measured on a BYK-Gardner Haze-gard plus, and shown plotted vs. dose in FIGS. 6A-6B, along with the fitting curves as previously described with reference to FIG. 5.

Generation of Haze Gradient Sample:

The same coating solution as used for the calibration curve, above, was syringe-pumped at a rate of 5 cc/min into a 20.3 cm (8-inch) wide slot-type coating die. The slot coating die uniformly distributed a 20.3 cm wide coating onto a PET substrate moving at 5 ft/min (152 cm/min).

Figure 6C:
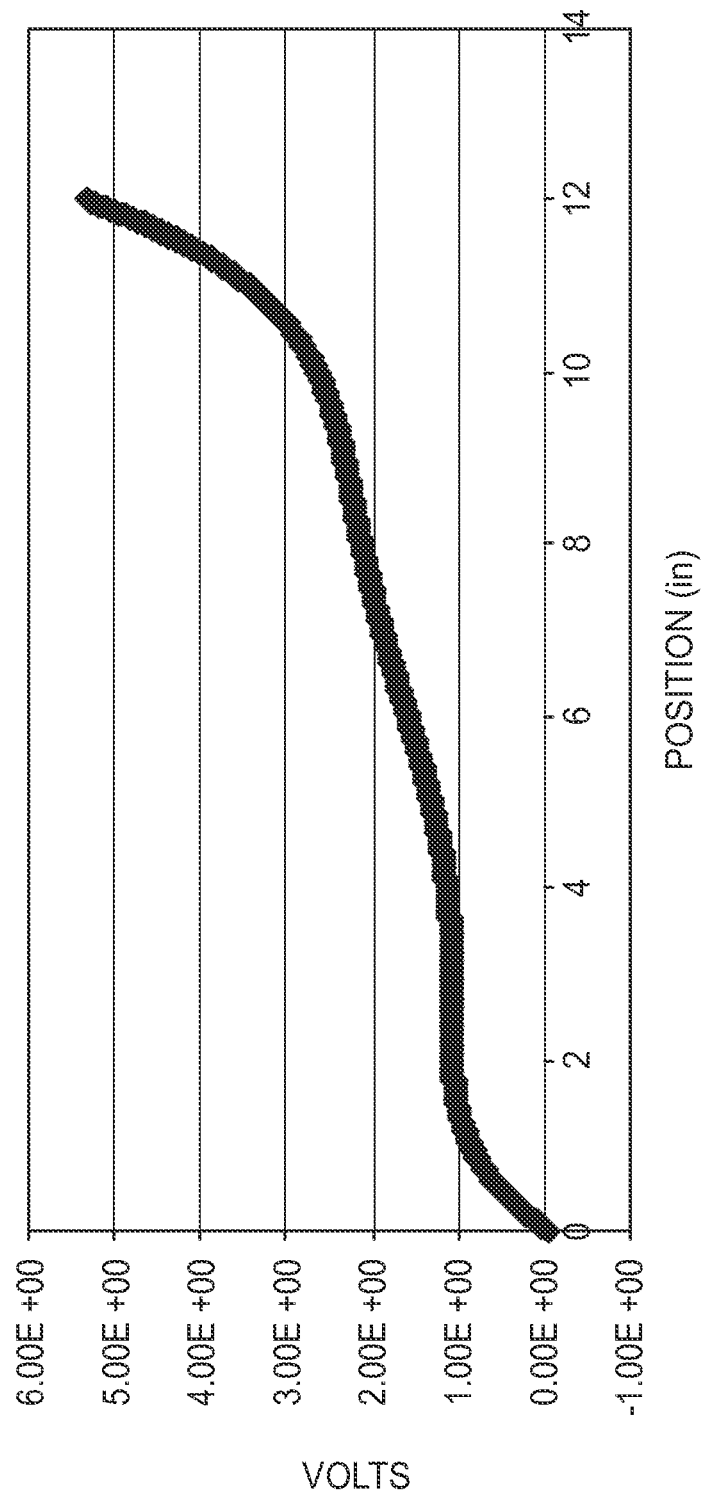
FIG. 6C is a graph of Volts vs downweb position.
Figure 6D:
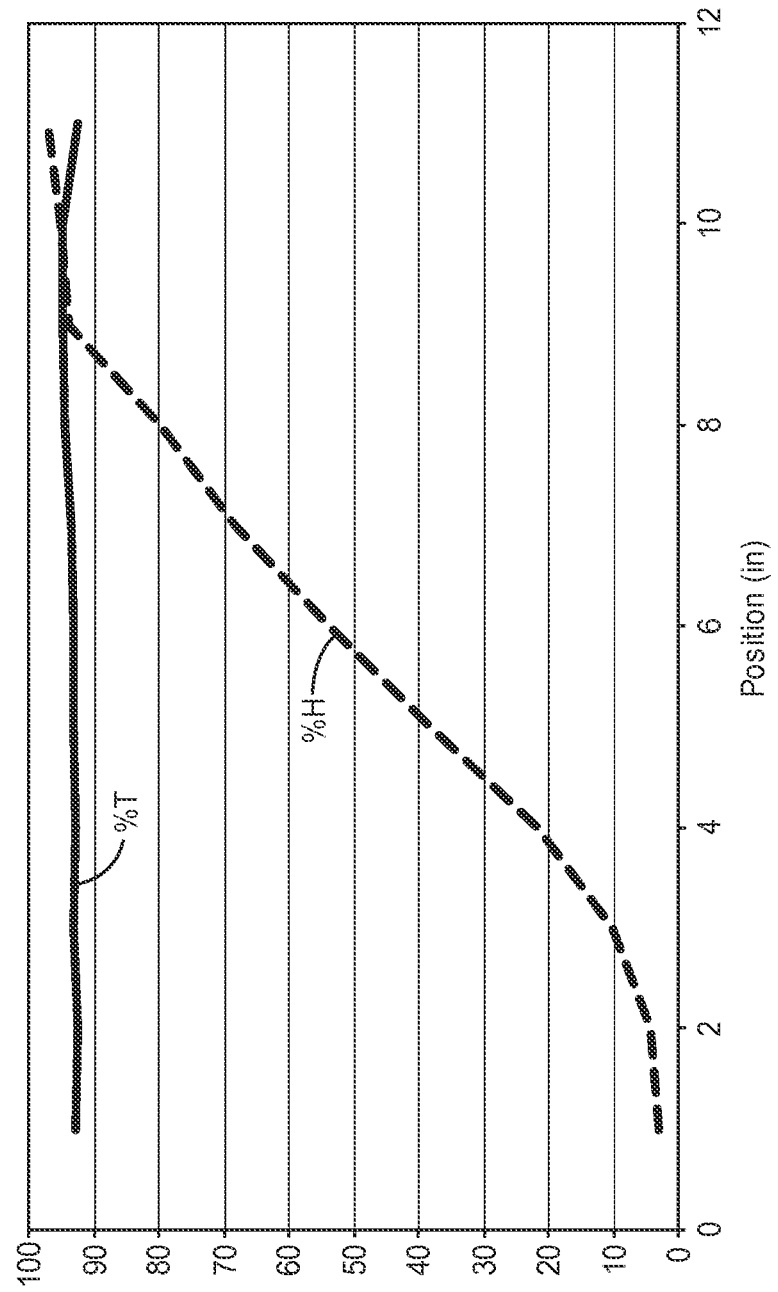
FIG. 6D is a graph of % T and % H vs downweb position.

The sample was processed in the same technique as the calibration curve. Samples were created by applying the temporal control voltage ramp to the lamp power supply as the web was passing through the lamp cure region. The voltage ramp profile is shown in FIG. 6C. The corresponding % H and % T vs position is shown in FIG. 6D. The graph shows that the Haze changes linearly with position from about 10% H to about 95% H, while the % T remains constant throughout the length of the sample.

Generation of Transmission Gradient Sample:

The same coating solution as used for the calibration curve above was syringe-pumped at a rate of 5 cc/min into a 20.3 cm (8-inch) wide slot-type coating die. The slot coating die uniformly distributed a 20.3 cm wide coating onto a PET substrate moving at 5 ft/min (152 cm/min).

Figure 6E:
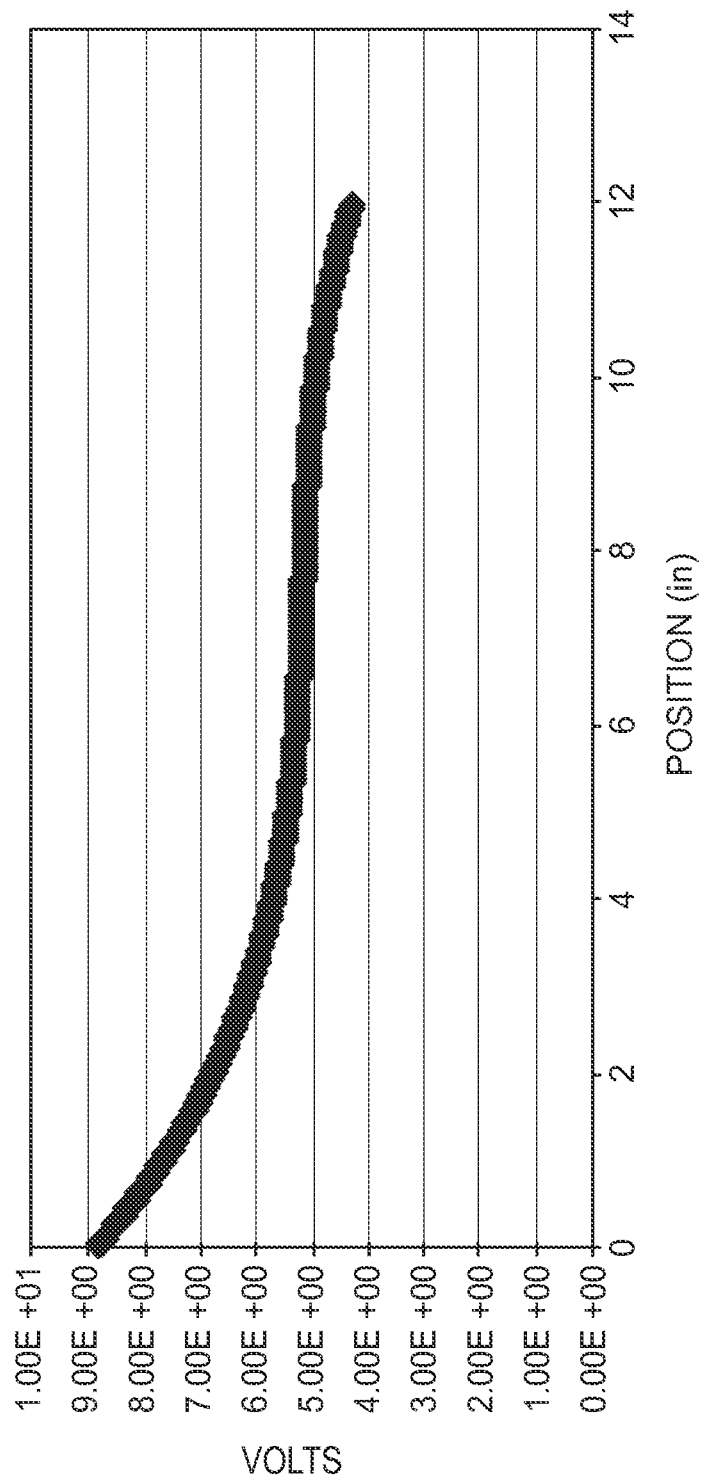
FIG. 6E is a graph of Volts vs downweb position.
Figure 6F:
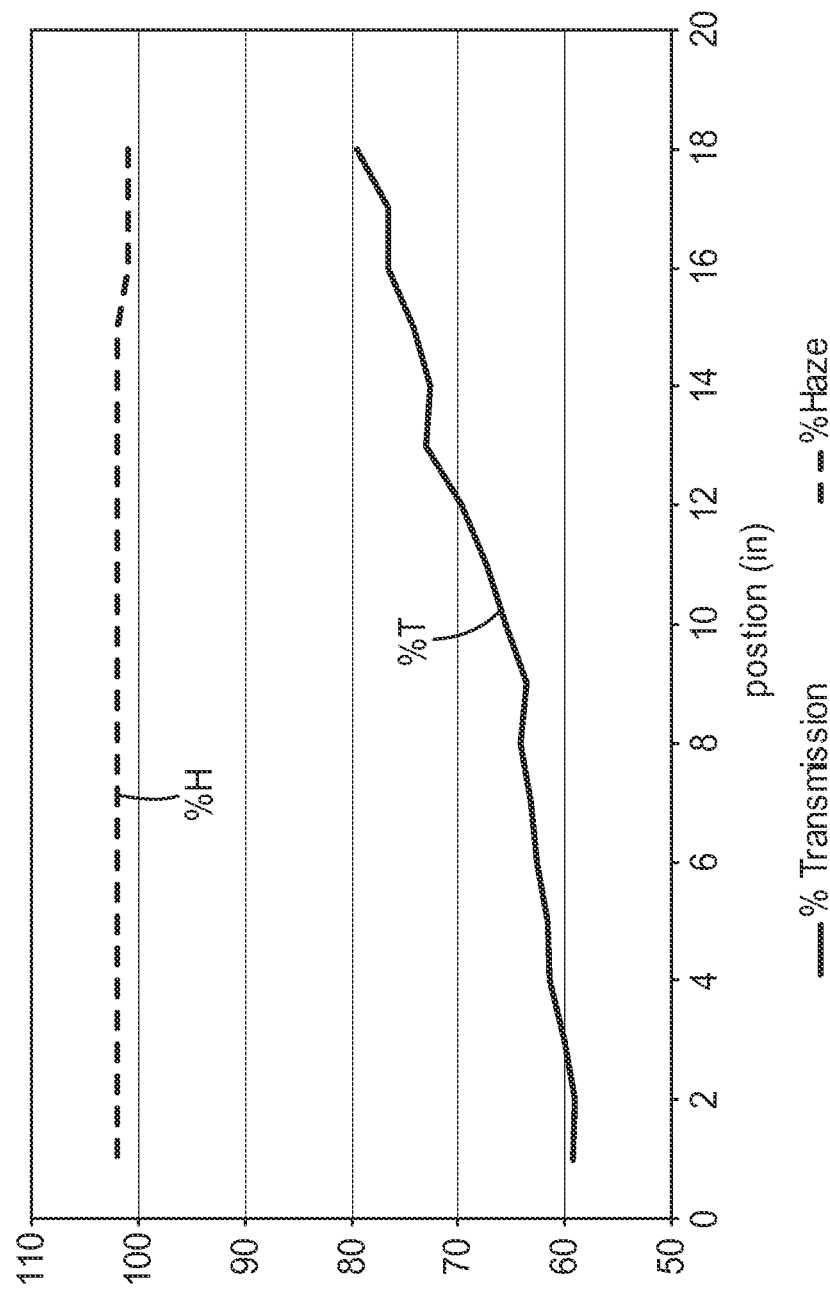
FIG. 6F is a graph of % T and % H vs downweb position.

The sample was then processed using the same technique as the calibration curve. Samples were created by applying the temporal control voltage ramp to the lamp power supply as the web was passing through the lamp cure region. The voltage ramp profile is shown in FIG. 6E. The corresponding % H and % T vs position is shown in FIG. 6F. The graph shows that the Transmission varies from about 60-80% T while the % H remains essentially constant throughout the length of the sample.

Example 2

Crossweb Gradients of Haze and Transmission

The coating solution "A" was syringe-pumped at a rate of 2.5 cc/min into a 10.15 cm (4-inch) wide slot-type coating die. The slot coating die uniformly distributed a 10.15 cm wide coating onto a PET substrate moving at 5 ft/min (152 cm/min).

The coating was then polymerized by passing the coated substrate through a UV-LED cure chamber that included a quartz window to allow passage of UV radiation. The UV-LED bank included a rectangular array of 352 UV-LEDs, 16 down-web by 22 cross-web (approximately covering a 20.3 cm×20.3 cm area). The UV-LEDs were placed on two water-cooled heat sinks. The LEDs (available from Cree, Inc., Durham N.C.) operated at a nominal wavelength of 395 nm, and were run at 45 Volts at 13 Amps. The UV-LED array was powered and fan-cooled by a TENMA 72-6910 (42V/10A) power supply (available from Tenma, Springboro Ohio). The UV-LEDs were positioned above the cure chamber quartz window at a distance of approximately 2.54 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber. A chrome-on-quartz mask was positioned between the LED lamps and the coating. This mask was a linear gradient of transmission ranging from 100% T to 0% T across the 10.15 cm coating width.

After being polymerized by the UV-LEDs, the solvent in the cured coating was removed by transporting the coating to a drying oven operating at 150° F. (66 C) for 2 minutes at a web speed of 5 ft/min. Next, the dried coating was post-cured using a Fusion System Model I300P configured with an H-bulb (available from Fusion UV Systems, Gaithersburg Md.), operated at full power. The UV Fusion chamber was supplied with a flow of nitrogen that resulted in an oxygen concentration of approximately 50 ppm in the chamber.

The resulting sample had a high haze with low transmission along one edge, and a low haze with high transmission along an opposite edge.

Example 3

Combined Downweb and Thickness (Z-Axis) Gradients of Refractive Index

The coating solution "B" was syringe-pumped at a rate of 2.5 cc/min into a 10.15 cm (4-inch) wide slot-type coating die. The slot coating die uniformly distributed a 10.15 cm wide coating onto a PET substrate moving at 5 ft/min (152 cm/min).

The coating was then polymerized by passing the coated substrate through a UV-LED cure chamber that included a quartz window to allow passage of UV radiation. The UV-LED bank included a rectangular array of 352 UV-LEDs, 16 down-web by 22 cross-web (approximately covering a 20.3 cm×20.3 cm area). The UV-LEDs were placed on two water-cooled heat sinks. The LEDs (available from Cree, Inc., Durham N.C.) operated at a nominal wavelength of 395 nm, and were run at 45 Volts at 13 Amps. The UV-LED array was powered and fan-cooled by a TENMA 72-6910 (42V/10A) power supply (available from Tenma, Springboro Ohio). The UV-LEDs were positioned above the cure chamber quartz window at a distance of approximately 2.54 cm from the substrate. The UV-LED cure chamber was supplied with a flow of nitrogen at a flow rate of 46.7 liters/min (100 cubic feet per hour). A 1.5 cfh (0.7 liters/min) stream of air was bled into this nitrogen stream resulting in an oxygen concentration at the lamp of approximately 1000 ppm. The high concentration of oxygen in the cure chamber resulted in inhibited curing at the surface of the coating, as described, for example, in co-pending U.S. patent application entitled "Gradient Low Index Article and Method" U.S. Ser. No. 61/254,673. After the coating was further dried and cured, according the technique described elsewhere in Example 1, this inhibition resulted in a gradient of refractive index through the thickness of the coating. As a result, a "skin" coating which had very low porosity (and corresponding higher refractive index) developed on the surface closest to the oxygen inhibition.

Figure 7A:
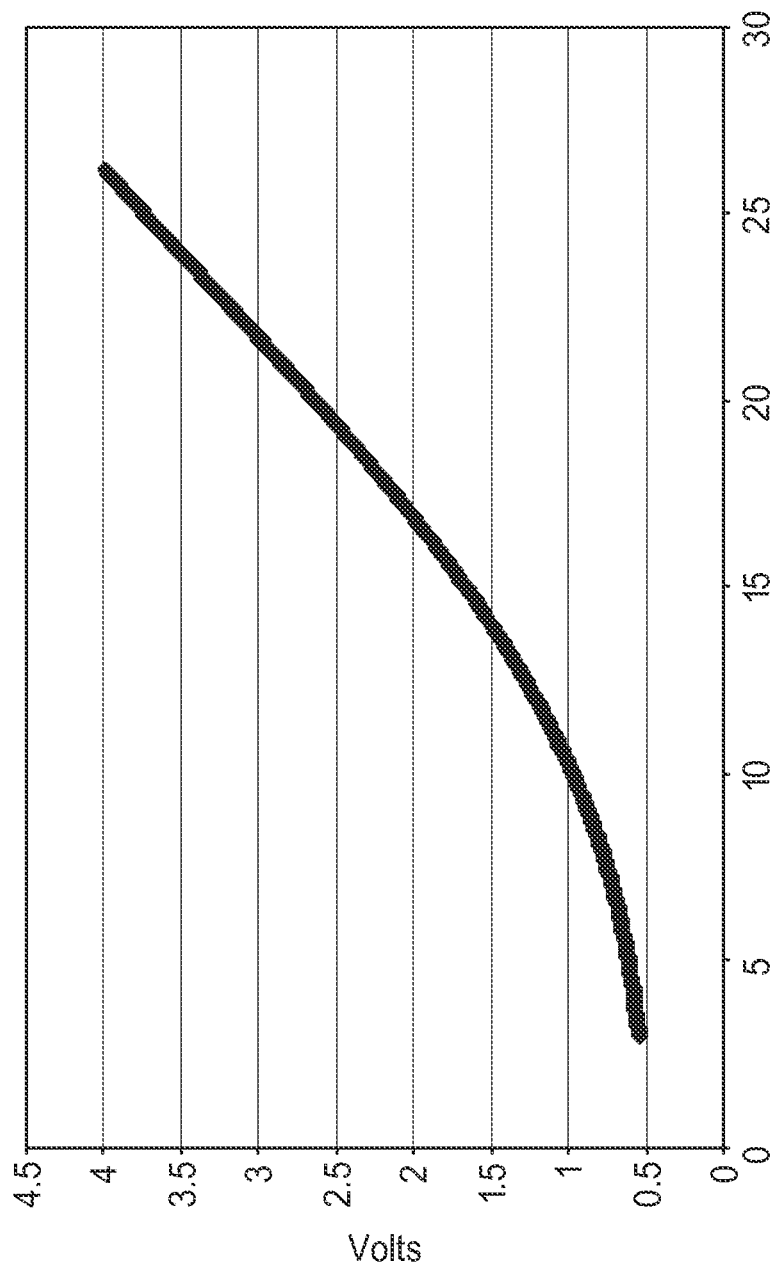
FIG. 7A is a graph of Volts vs downweb position.

Simultaneously, the power supply was temporally controlled, as described elsewhere, by applying a control voltage to the power supply's input pin with a Compaq 6910p laptop and a DAQCard-6062E PCMCIA Multifunction I/O card (National Instruments, Austin Tex.) controlled with LabView software (National Instruments, Austin Tex.). Samples were created by applying the temporal control voltage ramp to the lamp power supply as the web was running through the lamp. FIG. 7A shows the voltage ramp profile used in Example 3.

Figure 7B:
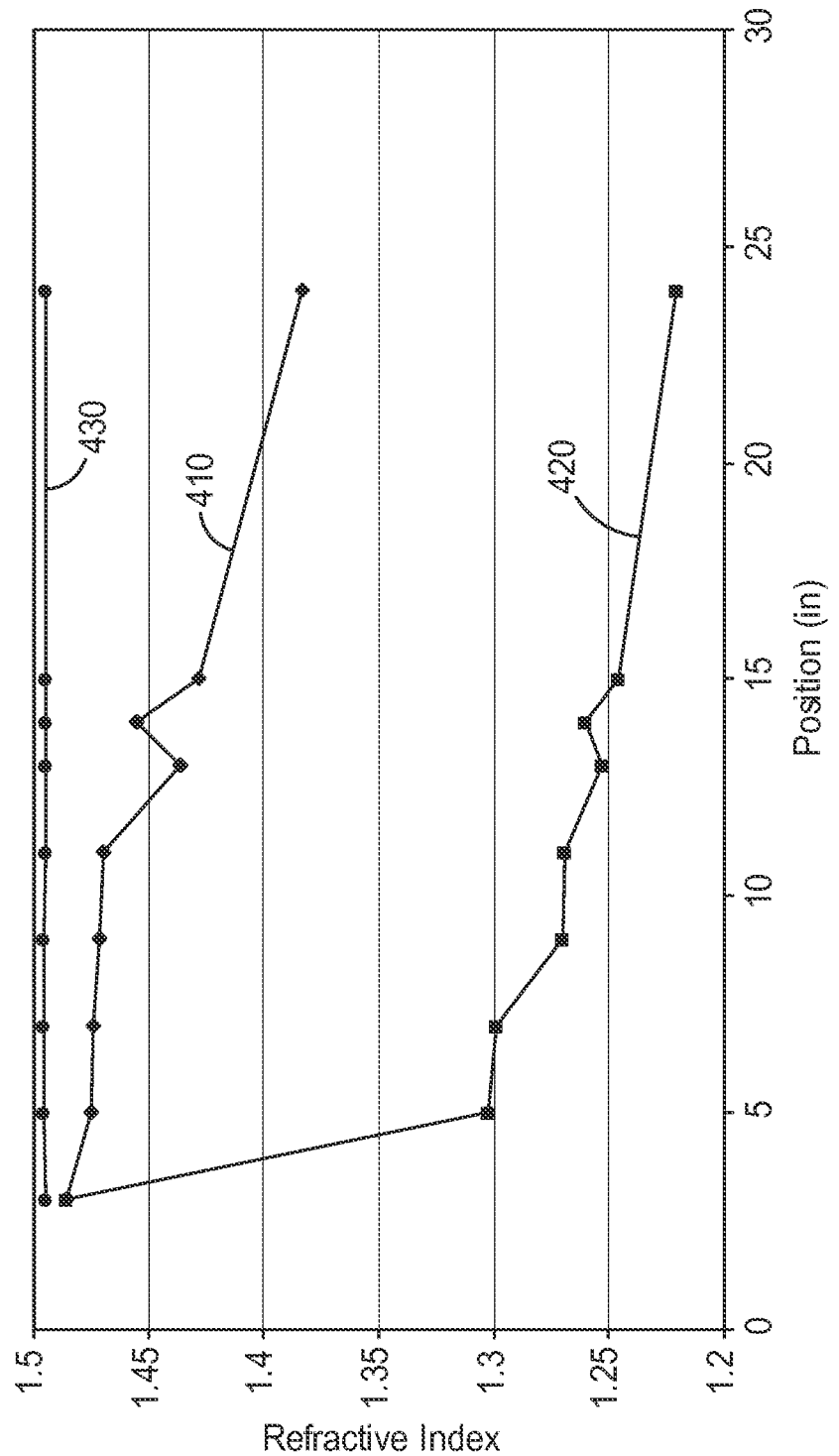
FIG. 7B is a graph of refractive index vs downweb position.

The refractive indices of each of the samples were measured in two orientations: first with the coating side adjacent to the grating, second with the PET substrate adjacent to the prism, as described elsewhere. The corresponding refractive index vs position is shown in FIG. 7B. First curve 410 shows the refractive index of the low index layer at the surface of the layer. Curve 410 shows that the index varies from 1.38 to 1.48. Second curve 420 shows the index of the low index layer in the area adjacent to the interface between the substrate and the low index coating. At each position there is a difference in index between the interior of the coating shown by second curve 420 and the top of the coating shown by first curve 410. This difference at each position defines the 'Z' gradient of the coating.

Second curve 420 shows the refractive index in the interior of the coating varies from 1.22 to 1.48. This variation of index with position defines the 'X' gradient of the coating. Third curve 430 shows the index of the PET substrate is constant throughout the sample.

Example 4

Bulb-Hiding Gradient for Direct-Lit Backlights

This Example describes a film that was produced having haze gradients specifically designed to increase bulb hiding in direct-lit backlights, such as used in liquid crystal displays. The haze gradient film was characterized by having stripes of high haze and low haze areas, positioned at the pitch of the bulbs. When the high haze stripes were aligned over the bulb, they can even out the bright spots of incident light coming from the bulb. The pattern of the haze was created by optically patterning the porous layer made by the GEL process using photomasks under the LED lamps, and demonstrates patterned morphology using the GEL process.

Preparation of Coating Solution "C"

N-(3-triethoxysilylpropyl)methoxyethoxyethyl carbamate (PEG2silane) was first prepared. A 250 ml round-bottomed flask equipped with a magnetic stir bar was charged with diethylene glycol methyl ether (150 g) and methyl ethyl ketone (65 g). A majority of the solvent was removed via rotary evaporation to remove water. 3-(triethoxysilyl)propylisocyanate (308.5 g) was charged to the flask. Dibutyltin dilaurate (~3 mg) was added, and the mixture stirred. The reaction proceeded with a mild exotherm. The reaction was run for approximately 16 hr at which time infra red spectroscopy showed no isocyanate was left. The remainder of the solvent was removed via rotary evaporation (90 C). The resulting PEG2silane was a clear colorless liquid.

In a 2 liter three-neck flask, equipped with a condenser and a thermometer, 288 grams of Nalco 2327 (40% wt 20 nm slica dispersed in water, available from Nalco, Naperville, Ill.) and 300 g of 1-methoxy-propanol were mixed together under rapid stirring. After that, 8.35 g of trimethoxy(2,4,4 trimethylpentyl)silane (available from Gelest, Morrisville, Pa.) and 13.12 g of PEG2 silane (described above) were added, then the mixture was stirred for 30 min. 500 g of additional 1-methoxy-propanol was then added. The mixture was heated to 85° C. for 6 hours. The resulting solution was allowed to cool down to room temperature. Most of the solvents of water/1-methoxy-propanol were removed using a rotary evaporator in a water-bath at 60° C., resulting in a 42.87% wt isooctyl/PEG2 modified 20 nm silica solution. The process was repeated several times to result in a large batch for processing.

Coating solution C was prepared by mixing the following together under rapid stirring until a homogenous coating solution obtained: 292.5 grams of 42.87% isooctyl/PEG2 modified 20 nm silica solution, 153.6 grams SR444 (available from Sartomer, Exton, Pa.), 400 grams isopropyl alcohol, 30 grams 1-methoxy-propanol, and 8.5 grams Irgacure 184 (Ciba Specialties Chemical, Tarrytown, N.Y.).

Coating solution "C" was syringe-pumped at a rate of 5.0 cc/min into a 20.3 cm (8-inch) wide slot-type coating die. The slot coating die uniformly distributed a 20.3 cm wide coating onto a substrate moving at 5 ft/min (152 cm/min).

Next, the coating was polymerized by passing the coated substrate through a UV-LED cure chamber that included a quartz window to allow passage of UV radiation. The UV-LED bank included a rectangular array of 352 UV-LEDs, 16 down-web by 22 cross-web (approximately covering a 20.3 cm×20.3 cm area). The UV-LEDs were placed on two water-cooled heat sinks. The LEDs (available from Cree, Inc., Durham N.C.) operated at a nominal wavelength of 395 nm, and were run at 45 Volts at 13 Amps. The UV-LED array was powered and fan-cooled by a TENMA 72-6910 (42V/10A) power supply (available from Tenma, Springboro Ohio). The UV-LEDs were positioned above the cure chamber quartz window at a distance of approximately 2.54 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber. A photomask was aligned underneath the UV-LEDs, between the UV-LED lamps and the (20.3 cm×20.3) quartz plate. The photomask was a PET substrate covered with aluminum tape trapezoids arranged in a linear crossweb pattern to block a portion of the light from the coated web.

After being polymerized by the UV-LEDs, the solvent in the cured coating was removed by transporting the coating to a drying oven operating at 150° F. for 2 minutes at a web speed of 5 ft/min. Next, the dried coating was post-cured using a Fusion System Model I300P configured with an H-bulb (available from Fusion UV Systems, Gaithersburg Md.). The UV Fusion chamber was supplied with a flow of nitrogen that resulted in an oxygen concentration of approximately 50 ppm in the chamber. A sinusoidal variation in the % T and % C resulted, where the % T and % C ranged from 76% T and 72% C in a first region, to 58% T and 0.6% C in a second adjacent region.

Example 5

Patterned Retroreflective Film

This Example describes a patterned retroreflector that includes areas that are retroreflective and areas that are not retroreflective. The position of these areas was controlled by the refractive index of the material behind a corner cube retroreflector. The pattern of the index was created by optically patterning the porous layer made by the GEL process and demonstrates patterned morphology using the GEL process.
Preparation of Coating Solution "D"

In a 2 liter three-neck flask, equipped with a condenser and a thermometer, 960 grams of IPA-ST-UP organosilica elongated particles (15.6% wt elongated silica dispersed in isopropyl alcohol, available from Nissan Chemical America, Houston, Tex.), 19.2 grams of deionized water, and 350 grams of 1-methoxy-2-propanol were mixed under rapid stirring. The elongated particles had a diameter in a range from about 9 nm to about 15 nm and a length in a range of about 40 nm to about 100 nm. The particles were dispersed in a 15.2% wt IPA, and 22.8 grams of Silquest A-174 silane (available from GE Advanced Materials, Wilton Conn.) was added to the flask. The resulting mixture was stirred for 30 minutes.

The mixture was kept at 81° C. for 16 hours. Next, the solution was allowed to cool down to room temperature, and about 950 grams of the solvent in the solution was removed using a rotary evaporator under a 40° C. water-bath, resulting in a clear A-174-modified elongated silica solution having 44.56% wt A-174-modified elongated silica dispersed in 1-methoxy-2-propanol (herein A-174 modified UP silica). The process was repeated several times to result in a large batch for processing.

Coating solution "D" was prepared by mixing the following together under rapid stirring until a homogenous coating solution was obtained: 336.8 grams A-174 modified UP silica, 150 grams SR444 (available from Sartomer, Exton, Pa.), 263 grams isopropyl alcohol, 7.5 grams Irgacure 184, and 0.375 grams Irgacure 819 (both available from Ciba Specialties Chemical, Tarrytown, N.Y.).

The cube-corner side of a cube-corner retroreflector was hand coated with Coating Solution "D", and a polypropylene release liner was place over the coating. A nickel patterned on quartz mask having a rectangular grid pattern was placed on top of the polypropylene release liner. The sample was then cured in a belt fed cure chamber (RPC industries) fitted with a Fusion H bulb in air. The sample was then removed from the chamber, the mask and release liner removed, and the sample was placed in a 120 F oven for about 5 minutes to dry. The sample was then passed again through the cure chamber (in a nitrogen atmosphere) to fully cure the remaining acrylate. The sample was hand laminated with TiO2 loaded transfer adhesive. The samples showed the rectangular grid pattern was visible in retroreflection, where the low index coating retained the optical activity of the retroreflector.

The embodiments described can be used anywhere that an optical film can be used, for example, for control of optical properties of refractive index, haze, transmission, and clarity.

In general, the embodiments described can be applied anywhere that thin, optically transmissive structures are used, including light management films or light management film stacks; backlights including hollow and solid backlights; displays such as TV, notebook computers, computer monitors; and also used for advertising, information display or lighting. The present disclosure is also applicable to electronic devices including laptop computers and handheld devices such as Personal Data Assistants (PDAs), personal gaming devices, cell phones, personal media players, handheld computers and the like, which incorporate optical displays. Backlights using textured films of the present disclosure have application in many other areas. For example, backlit LCD systems, luminaires, task lights, light sources, signs and point of purchase displays can be made using the described embodiments.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:
1. A gradient polymer film, comprising:
 a binder; and
 a plurality of nanovoids, wherein a local volume fraction of the plurality of nanovoids varies across a transverse plane of the gradient polymer film.
2. The gradient polymer film of claim 1, wherein the local volume fraction remains essentially constant along a first direction within the transverse plane.
3. The gradient polymer film of claim 1, wherein the local volume fraction further varies in a thickness direction perpendicular to the transverse plane.
4. The gradient polymer film of claim 1, wherein the local volume fraction comprises a local pore-size distribution.
5. A gradient polymer film, comprising:
 a binder; and
 a plurality of nanovoids, wherein a first local volume fraction of the plurality of nanovoids proximate a first region of the gradient polymer film is greater than a second local volume fraction of the plurality of nanovoids proximate a second region adjacent the first region, along a transverse plane of the gradient polymer film.
6. The gradient polymer film of claim 5, wherein the first local volume fraction of the plurality of nanovoids decreases monotonically to the second local volume fraction of the plurality of nanovoids, along the transverse plane of the gradient polymer film.
7. An optical construction, comprising:
 a substrate; and the gradient polymer film of claim 1 or claim 5 disposed on the substrate.

8. The optical construction of claim 7, wherein the substrate comprises at least one of a polymer film, a release liner, an adhesive, a volume diffuser, a surface diffuser, a diffractive diffuser, a refractive diffuser, a retroreflector, an absorbing polarizer, a reflective polarizer, a fiber polarizer, a cholesteric polarizer, a multilayer polarizer, a wire grid polarizer, a partial reflector, a volume reflector, a multilayer polymer reflector, a metal reflector, a metal/dielectric multilayer reflector, a fiber, a lens, a microstructure, a solid light guide, or a hollow light guide.

9. The optical construction of claim 8, wherein the microstructure comprises a cube-corner retroreflector, a brightness enhancing film (BEF), a lenslet, a gain diffuser, a light extraction film, or a turning film.

10. The optical construction of claim 7, wherein the gradient polymer film comprises a bulb-hiding film.

11. The gradient polymer film of claim 1 or claim 5, wherein at least one of refractive index, haze, clarity, or transmission vary across the transverse plane.

12. A patterned light guide, comprising:
a light guide; and
a gradient polymer film disposed on the light guide, the gradient polymer film comprising:
a binder; and
a plurality of nanovoids, wherein a first local volume fraction of the plurality of nanovoids proximate a first region of the gradient polymer film is greater than a second local volume fraction of the plurality of nanovoids proximate a second region adjacent the first region, along a transverse plane of the gradient polymer film.

13. The patterned light guide of claim 12, wherein the first region has a first index of refraction lower than the index of the refraction of the light guide, and the second region has a second index of refraction not lower than the index of refraction of the light guide, such that light within the light guide is capable of exiting through the second region but not through the first region.

14. The patterned light guide of claim 13, further comprising a light redirecting element disposed to receive light exiting the gradient polymer, the light redirecting element selected from a structured surface or an angle selective multilayer optical film.

\* \* \* \* \*